(12) United States Patent
Ishikawa et al.

(10) Patent No.: US 10,306,045 B2
(45) Date of Patent: May 28, 2019

(54) COMMUNICATION CONTROL DEVICE, METHOD OF CONTROLLING COMMUNICATION, AND PROGRAM

(71) Applicant: Sony Corporation, Tokyo (JP)

(72) Inventors: Hirotaka Ishikawa, Kanagawa (JP); Makoto Takahashi, Tokyo (JP); Yuichi Suzuki, Chiba (JP); Yasuki Kanema, Tokyo (JP); Chisako Kajihara, Tokyo (JP); Tohru Kadono, Tokyo (JP); Takeshi Iwatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 112 days.

(21) Appl. No.: 15/118,648

(22) PCT Filed: Jan. 14, 2015

(86) PCT No.: PCT/JP2015/050828
§ 371 (c)(1),
(2) Date: Aug. 12, 2016

(87) PCT Pub. No.: WO2015/125517
PCT Pub. Date: Aug. 27, 2015

(65) Prior Publication Data
US 2017/0054839 A1 Feb. 23, 2017

(30) Foreign Application Priority Data
Feb. 21, 2014 (JP) .................. 2014-032010

(51) Int. Cl.
*H04M 1/725* (2006.01)
*H04W 52/02* (2009.01)
*H04W 92/08* (2009.01)

(52) U.S. Cl.
CPC ..... *H04M 1/72527* (2013.01); *H04M 1/7253* (2013.01); *H04M 1/7255* (2013.01);
(Continued)

(58) Field of Classification Search
CPC ............. H04M 1/2527; H04M 1/7255; H04W 52/0274
See application file for complete search history.

(56) References Cited

U.S. PATENT DOCUMENTS

| 2007/0060118 A1* | 3/2007 | Guyette ............ H04M 1/72533 455/420 |
| 2010/0080165 A1* | 4/2010 | Hossain ................. H04B 7/155 370/315 |

(Continued)

FOREIGN PATENT DOCUMENTS

| CN | 101483862 | 7/2009 |
| CN | 102778948 | 11/2012 |

(Continued)

OTHER PUBLICATIONS

Written Opinion and English translation thereof dated Apr. 7, 2015 in connection with International Application No. PCT/JP2015/050828.

(Continued)

*Primary Examiner* — Muthuswamy G Manoharan
(74) *Attorney, Agent, or Firm* — Wolf, Greenfield & Sacks, P.C.

(57) ABSTRACT

[Object] To reduce power consumption even more.
[Solution] Provided is a communication control device including a communication necessity information acquisition unit configured to acquire communication necessity information indicating necessity to communicate with an external device, and a drive control unit configured to control drive of a first communication unit and a second communication unit on a basis of the acquired communication necessity information, the first communication unit communicating with the external device using a first communication mode, the second communication unit communicating with the external device using a second communi- (Continued)

cation mode capable of transferring data at a rate higher than the first communication mode. The drive control unit controls a drive state of each of the first communication unit and the second communication unit to be set to one of an active state capable of communicating with the external device, a power-saving state having lower power consumption than the active state, and an inactive state being a power off state.

19 Claims, 15 Drawing Sheets

(52) U.S. Cl.
CPC ........ *H04W 52/0274* (2013.01); *H04W 92/08* (2013.01); *Y02D 70/00* (2018.01); *Y02D 70/142* (2018.01); *Y02D 70/144* (2018.01); *Y02D 70/164* (2018.01); *Y02D 70/26* (2018.01)

(56) References Cited

U.S. PATENT DOCUMENTS

2014/0011469 A1* 1/2014 Fenn ................. H04W 4/22 455/404.1
2014/0106677 A1* 4/2014 Altman ............... H04B 1/3827 455/41.2
2014/0132410 A1* 5/2014 Chang ................ G06F 3/014 340/539.11
2014/0349584 A1* 11/2014 Clevorn .............. H04B 7/0689 455/67.13

FOREIGN PATENT DOCUMENTS

| JP | 2003-304412 A | 10/2003 |
| JP | 2004-112383 A | 4/2004 |
| JP | 2005-072867 A | 3/2005 |
| JP | 2013-162464 A | 8/2013 |

OTHER PUBLICATIONS

International Preliminary Report on Patentability and English translation thereof dated Sep. 1, 2016 in connection with International Application No. PCT/JP2015/050828.

International Search Report and English translation thereof dated Apr. 7, 2015 in connection with International Application No. PCT/JP2015/050828.

Chinese Office Action issued Feb. 3, 2019 in connection with Chinese Application No. 201580008432.X, and English translation thereof.

* cited by examiner

COMMUNICATION CONTROL DEVICE, METHOD OF CONTROLLING COMMUNICATION, AND PROGRAM

CROSS REFERENCE TO RELATED APPLICATIONS

This application claims the benefit under 35 U.S.C. § 371 as a U.S. National Stage Entry of International Application No. PCT/JP2015/050828, filed in the Japanese Patent Office as a Receiving Office on Jan. 14, 2015, which claims priority to Japanese Patent Application Number JP2014-032010, filed in the Japanese Patent Office on Feb. 21, 2014, each of which is hereby incorporated by reference in its entirety.

TECHNICAL FIELD

The present disclosure relates to a communication control device, a method of controlling communication, and a program.

BACKGROUND ART

In recent years, a wearable terminal has been actively developed as information processing devices used while being worn on the user's body. Various kinds of wearable terminals having a shape similar to that of a gadget that is typically attached to the user's body, such as wristwatch or eyeglasses types, are developed, which are intended for using them while being worn on the user in daily lives.

In terms of the purpose of use, it is desirable to provide a compact and lightweight wearable terminal to reduce the user's fatigue or load that is applied during wearing it. An eyeglasses type wearable terminal (a kind of head-mounted display (HMD) or the like) is worn on the user's head, and thus, in particular, there is a great demand from the viewpoint of getting a better sense of fit. However, the wearable terminal is necessary to be equipped with a battery having relative large capacity for long-term use, which unfortunately leads to an increase in size and weight of a housing of the battery.

Therefore, various techniques are developed to reduce power consumption in a wearable terminal. As one example, Patent Literature 1 discloses an eyeglass head mounted display device that is equipped with an earphone and causes an image to be displayed on the lens portion of the eyeglass. This eyeglass head mounted display device detects whether the earphone are attached to or detached from the user's ear and controls display of an image on the basis of a result obtained by the detection.

CITATION LIST

Patent Literature

Patent Literature 1: JP 2005-072867A

SUMMARY OF INVENTION

Technical Problem

Other versions of the wearable terminal that are capable of executing various types of applications while communicating with another information processing device are recently considered, such as another terminal of the user (e.g., smartphone and tablet personal computer (PC)) and a server located on a so-called cloud. To provide a wearable terminal with reduced power consumption, it is also necessary to consider the reduction in power consumption of the wearable terminal during communication as described above. However, in the technique disclosed in Patent Literature 1, no mention is made of the communication with the other information processing device and the power consumption during communication is not sufficiently taken into account.

In view of the above circumstances, it is desirable to further reduce power consumption of a wearable terminal by reduction in power consumption even more during communication. Therefore, an embodiment of the present disclosure provides a novel and improved communication control device, method of controlling communication, and program, capable of reducing power consumption even more.

Solution to Problem

According to an embodiment of the present disclosure, there is provided a communication control device including a communication necessity information acquisition unit configured to acquire communication necessity information indicating necessity to communicate with an external device, and a drive control unit configured to control drive of a first communication unit and a second communication unit on a basis of the acquired communication necessity information, the first communication unit communicating with the external device using a first communication mode, the second communication unit communicating with the external device using a second communication mode capable of transferring data at a rate higher than the first communication mode. The drive control unit controls a drive state of each of the first communication unit and the second communication unit to be set to one of an active state capable of communicating with the external device, a power-saving state having lower power consumption than the active state, and an inactive state being a power off state.

According to an embodiment of the present disclosure, there is provided a method of controlling communication, the method including acquiring communication necessity information indicating necessity to communicate with an external device, and controlling drive of a first communication unit and a second communication unit on a basis of the acquired communication necessity information, the first communication unit communicating with the external device using a first communication mode, the second communication unit communicating with the external device using a second communication mode capable of transferring data at a rate higher than the first communication mode. A drive state of each of the first communication unit and the second communication unit is controlled to be set to one of an active state capable of communicating with the external device, a power-saving state having lower power consumption than the active state, and an inactive state being a power off state.

According to an embodiment of the present disclosure, there is provided a program for causing a processor of a computer to implement a function of acquiring communication necessity information indicating necessity to communicate with an external device, and a function of controlling drive of a first communication unit and a second communication unit on a basis of the acquired communication necessity information, the first communication unit communicating with the external device using a first communication mode, the second communication unit communicating with the external device using a second communication mode capable of transferring data at a rate higher than the first communication mode. A drive state of each of the first communication unit and the second communication unit is controlled to be set to one of an active state capable of communicating with the external device, a power-saving state having lower power consumption than the active state, and an inactive state being a power off state.

According to the embodiments of the present disclosure, the drive control unit controls the drive state of the first communication unit and the second communication unit to be set to at least one of active, power-saving, and inactive states on the basis of the communication necessity information. Thus, it is possible to control the drive state of the first communication unit and the second communication unit to be set to a more appropriate state depending on the necessity for communication, thereby reducing power consumption even more.

Advantageous Effects of Invention

According to the embodiments of the present disclosure, the power consumption can be reduced even more. Note that the effects described above are not necessarily limited, and along with or instead of the effects, any advantageous effect set forth herein or other effects that can be expected from the present specification may be exhibited.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will be made in the following order.
1. System Configuration
2. Communication Control
   2-1. Functional Configuration of Wearable Terminal
   2-2. Processing Procedure for Method of Controlling Communication
3. Power-Saving Process by Communication Function Deactivation
4. Power-Saving Process during Use of Communication Function
5. Application Example
6. Modified Example
   6-1. Communication Authentication Process
   6-2. Modified Example having common Antenna
   6-3. Other Modified Examples
7. Hardware Configuration
8. Supplement In the following, a description will be given by taking a case where a wearable terminal is a head-mounted display (HMD) as one example of a preferred embodiment of the present disclosure. However, the present embodiment is not limited to such an example. The communication control according to the present embodiment described below may be applied to any type of terminal as long as the wearable terminal has a communication function.

(1. System Configuration)

Figure 1:
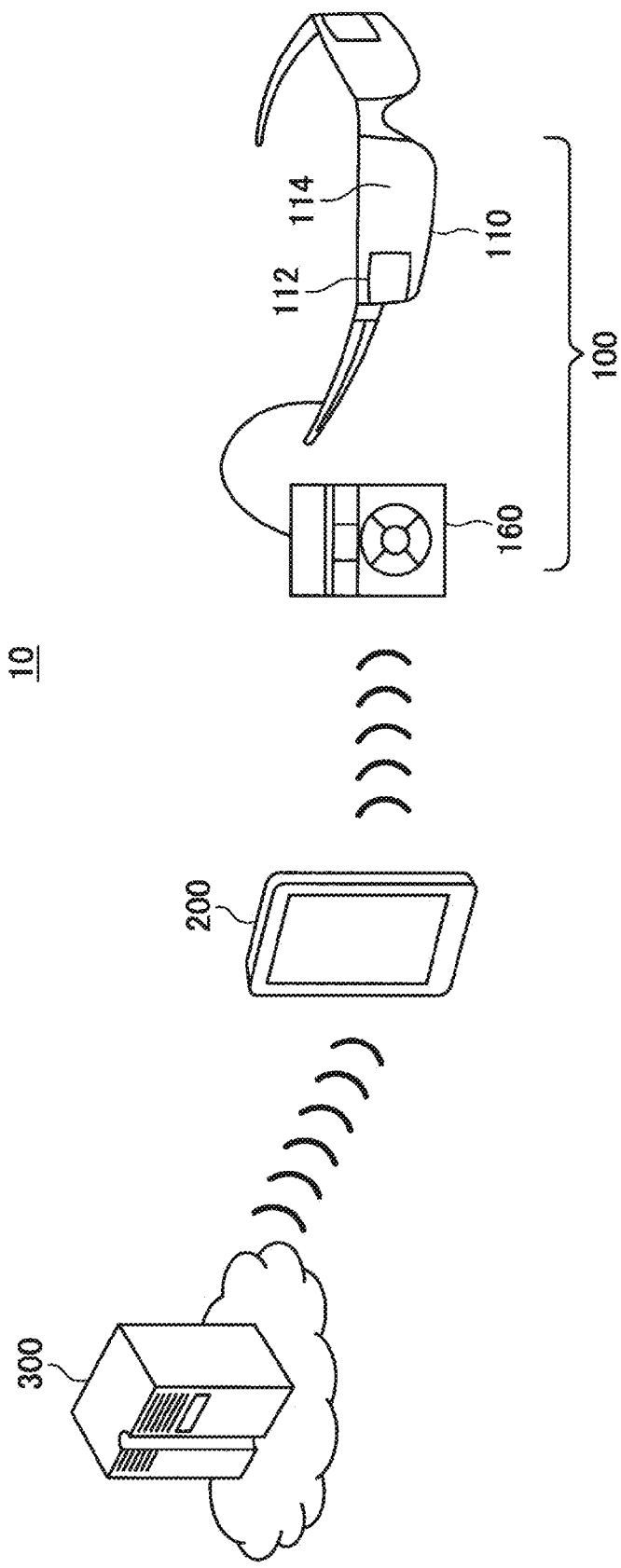
FIG. 1 is a diagram showing a schematic configuration of a system according to an embodiment of the present disclosure.
Figure 2:
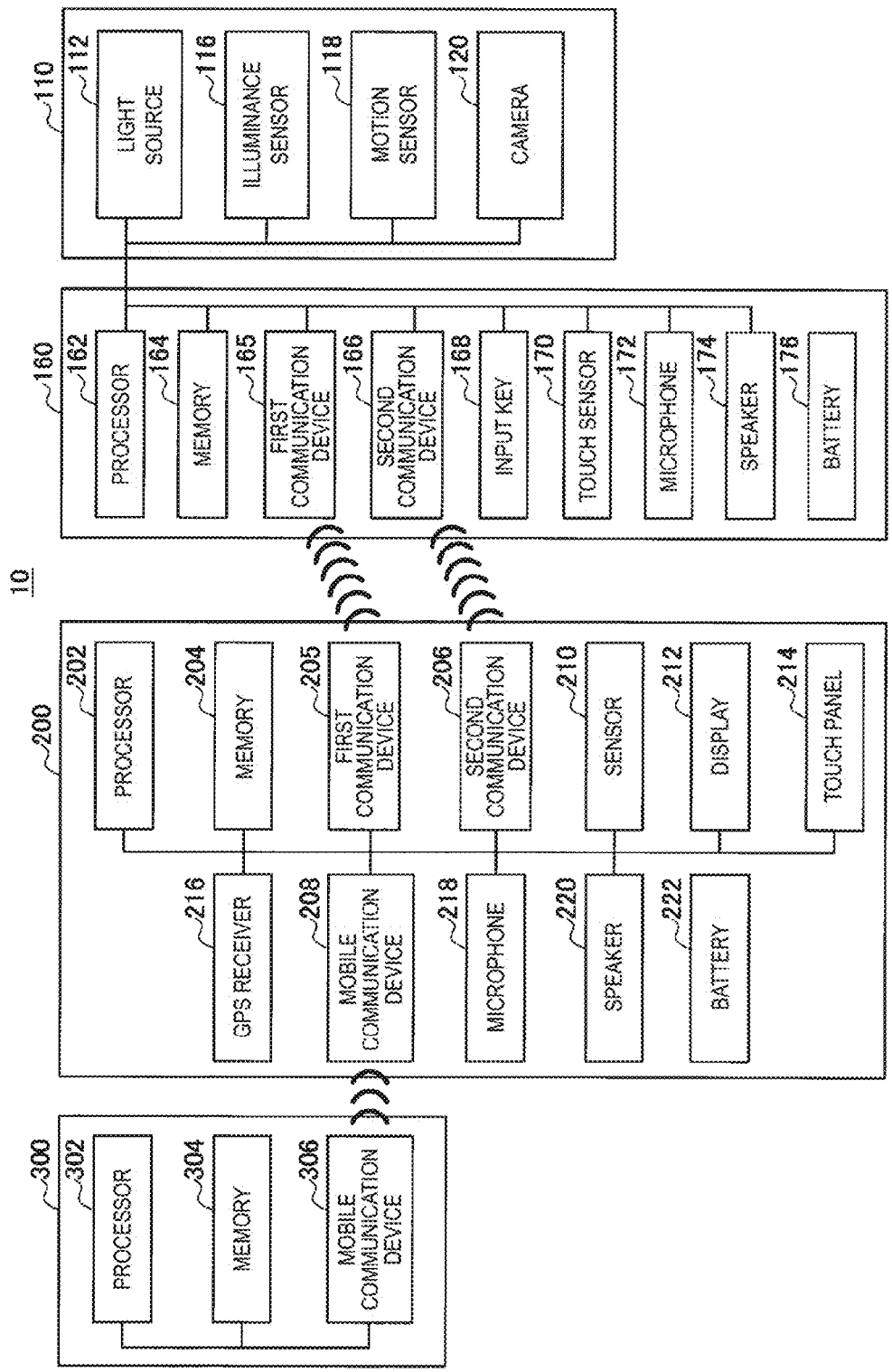
FIG. 2 is a schematic block diagram showing a hardware configuration of the system shown in FIG. 1.

A schematic configuration of a system according to an embodiment of the present disclosure will be described with reference to FIGS. 1 and 2. FIG. 1 is a schematic diagram showing the configuration of a system according to an embodiment of the present disclosure. FIG. 2 is a schematic block diagram showing a hardware configuration of the system shown in FIG. 1.

Referring to FIGS. 1 and 2, the system 10 according to the present embodiment is configured to include a head-mounted display (HMD) 100, a smartphone 200, and a server 300. The configuration of each of the components will be described below.

(Head-Mounted Display)

The HMD 100 includes a display unit 110 and a control unit 160. The display unit 110 has a housing in the shape of, for example, glasses, and is worn by a user on his or her head. The control unit 160 is connected to the display unit 110 by a cable.

The display unit 110 is provided with a light source 112 and a light guide plate 114 as shown in FIG. 1. The light source 112 emits image display light according to control of the control unit 160. The light guide plate 114 guides the image display light incident from the light source 112, and then emits the image display light to a position corresponding to the eyes of the user. The eyes of the user receive incidence of light that is incident on the light guide plate 114 from a real space and is then transmitted through the light guide plate 114, and the image display light guided from the light source 112 by the light guide plate 114. Accordingly, the user wearing the display unit 110 can perceive an image being superimposed on the real space. Note that, for the configuration for causing the image display light to be emitted from the light source 112 through the light guide plate 114, for example, the technology disclosed in JP4776285B described above may be used. The display unit 110 may be further provided with an optical system that is not illustrated for the configuration.

Further, the display unit 110 is configured to include an illuminance sensor 116, a motion sensor 118, and a camera 120, as shown in FIG. 2. The illuminance sensor 116 detects the illuminance of light that is incident on the display unit 110 toward the user from the real space. As one example, the illuminance sensor 116 may have directivity to detect the illuminance of an area corresponding to the user's field of view in the real space. The motion sensor 118 includes a three-axis acceleration sensor, a three-axis gyro sensor, and a three-axial geomagnetic sensor, as an example. The HMD 100 may specify the attitude and movement (displacement and rotation) of the display unit 110, on the basis of the acceleration, angular velocity, and orientation of the display unit 110 detected by these sensors. When the display unit 110 is worn on the user's head, the attitude and movement of the display unit 110 may be regarded as those of the user's head. The camera 120 captures an image in the real space. The camera 120 may capture still or moving images. The image captured by the camera 120 is processed as an image corresponding to the user's field of view in the real space, as one example.

The control unit 160 is configured to include a processor 162, a memory 164, a first communication device 165, a second communication device 166, an input key 168, a touch sensor 170, a microphone 172, a speaker 174, and a battery 176.

The processor 162 operates in accordance with a program stored in the memory 164 to implement various functions. Functions of a communication necessity information acquisition unit, a drive control unit, and a communication mode determination unit, which will be described later, may be implemented, as one example, by the processor 162. The processor 162 transmits a control signal to the display unit 110 by wire communication through a cable and controls emission of the image display light from the light source 112. The processor 162 is capable of acquiring data outputted from the illuminance sensor 116, the motion sensor 118, and the camera 120 included in the display unit 110, and is capable of performing a process based on the acquired data. As described later with reference to FIG. 3, the processor 202 operates in accordance with an HMD firmware 180 for driving the HMD 100 to cause the HMD 100 to perform various processes. The HMD firmware is stored in the memory 164.

The memory 164 stores various data for operating the processor 162. As one example, the memory 164 stores a program that is used to allow the processor 162 to implement various functions. The memory 164 temporarily stores data outputted from the illuminance sensor 116, the motion sensor 118, and the camera 120 included in the display unit 110. The memory 164 may include various memory devices that can be included in a typical information processing apparatus, such as read-only memory (ROM) and random access memory (RAM).

The input key 168, the touch sensor 170, and the microphone 172 are input interfaces for receiving a user's operation input. The input key 168 includes a return key and a push-to-talk (PTT) key, as an example, and acquires an operation input based on a key selection on the HMD 100. The touch sensor 170 similarly acquires a user's operation input on the HMD 100. More specifically, as one example, the touch sensor 170 acquires an operation input, such as tapping and swiping, by the user. The microphone 172 converts sound into a voice signal and provides it to the processor 162. In the present embodiment, inputting a voice to the HMD 100 through the microphone 172 can be regarded as the operation input performed by the user.

The speaker 174 outputs sound under control of the processor 162. The battery 176 supplies power to the entire components of the control unit 160 and the display unit 110. Note that a small size and light weight of the display unit 110 are realized in the HMD 100 such that the processor 162, the microphone 172, the speaker 174, the battery 176, and the like can be mounted in the control unit 160, and the display unit 110 and the control unit 160 are separated from each other, but connected with a cable. Since the control unit 160 is also carried by a user, it is desirable that it be as small and light as possible. Thus, by setting the functions realized by the processor 162 as minimum functions for controlling the display unit 110 and other functions to be realized by the smartphone 200, for example, a small size of the entire control unit 160 and battery 176 attributable to a reduction in power consumption of the processor 162 may also be further attempted.

Each of the first communication device 165 and the second communication device 166 performs wireless communication with the smartphone 200 using different communication modes. A communication mode, which is capable of performing data transfer at a relatively low rate (relatively low rate of data transfer) and has low power consumption, is preferably used as the communication mode of the first communication device 165 (a first communication mode). As one example, Bluetooth (registered trademark) or the like may be applied as the first communication mode. On the other hand, a communication mode, which is capable of performing data transfer at a rate higher than that of the first communication mode (relatively high rate of data transfer), is preferably used as the communication mode of the second communication device 166 (a second communication mode). As one example, a communication mode compliant to various communication standards in a wireless LAN such as Wi-Fi (registered trademark) may be applied as the second communication mode. The second communication mode has power consumption larger than that of the first communication mode but is capable of transferring data at rate higher than that of the first communication mode. The magnitude in power consumption of the first communication mode and the second communication mode described above may represent the magnitude in power consumption per unit time.

In the present embodiment, when the control unit 160 of the HMD 100 and the smartphone 200 communicate with each other, one of the first communication mode and the second communication mode is selected on the basis of communication necessity information described later, and the communication between them is performed using a communication device corresponding to the selected communication mode. As one example, when an amount of communication data is predicted on the basis of the communication necessity information, a communication mode having lower power consumption among the first communication mode and the second communication mode may be selected depending on the predicted amount of communication data. Thus, it is possible to reduce the power consumption in the HMD 100 even more.

In the present embodiment, the drive state of a communication device of the first communication device 165 and the second communication device 166, which does not perform communication, is controlled to be set to a state (also referred to as "power-saving state" hereinafter) in which power consumption is lower than that of a state (also referred to as "active state" hereinafter) that is capable of communicating with an external device or a state in which power is shut off (referred to as "inactive state" hereinafter). This allows the power consumption of a communication device of the first communication device 165 and the second communication device 166, which does not perform communication, to be reduced, thereby further reducing the power consumption of the HMD 100.

In this way, in the present embodiment, in the communication between the HMD 100 and the smartphone 200, a power-saving process of the HMD 100 is performed by appropriately switching a communication mode during use of a communication function (also referred to as "power-saving process during use of communication function" hereinafter). When the communication is not performed, the power-saving process of the HMD 100 is performed by gradually deactivating a communication function (also referred to as "power-saving process by communication function deactivation" hereinafter). The detailed description of these power-saving processes will be given in item (3. Power-saving process by communication function deactivation) and item (4. Power-saving process during use of communication function) described below.

(Smartphone)

The smartphone 200 is configured to include a processor 202, a memory 204, a first communication device 205, a second communication device 206, a mobile communication device 208, a sensor 210, a display 212, a touch panel 214, a global positioning system (GPS) receiver 216, a microphone 218, a speaker 220, and a battery 222.

The processor 202 operates in accordance with a program stored in the memory 204 to implement various functions. The memory 204 may include various memory devices that can be included in a typical information processing apparatus, such as ROM and RAM. As described later with reference to FIG. 3, the processor 202 operates in accordance with an HMD companion app 190 for driving the HMD 100 and provides appropriate instructions to the HMD 100, thereby causing the HMD 100 to perform various processes. The HMD companion app 190 is stored in the memory 204.

As described above, as the processor 202 realizes various functions in cooperation with the processor 162 provided in the control unit 160 of the HMD 100, the control unit 160 can be made even smaller. The memory 204 stores various kinds of data for operations of the smartphone 200. For example, the memory 204 stores programs for the processor 202 to realize the various functions. In addition, the memory 204 temporarily or permanently stores data acquired by the sensor 210 and the GPS receiver 216 and data transmitted to and received from the HMD 100.

The first communication device 205 communicates wirelessly with the first communication device 165 using a communication mode that is the same as that of the first communication device 165 of the control unit 160. In addition, the second communication device 206 communicates wirelessly with the second communication device 166 using a communication mode that is the same as that of the second communication device 166 of the control unit 160. In this way, the communication mode of the first communication device 205 and the second communication device 206 may correspond to the first communication device 165 and the second communication device 166 included in the control unit 160.

The mobile communication device 208 performs network communication with the server 300. Various communication modes used for communication using a so-called mobile network may be applied as a communication mode of the mobile communication device 208. The network communication may be performed via a mobile telephone network as an example.

The sensor 210 may be various sensors including acceleration sensors, gyro sensors, geomagnetic sensors, optical sensors, and acoustic sensors as an example, and acquires various types of information indicating a status of the attitude and movement of the smartphone 200. The display 212 displays various images according to control of the processor 202. The touch panel 214 is disposed on the display 212, and acquires touch operations of the user with respect to the display 212. The GPS receiver 216 receives GPS signals for measuring latitude, longitude, and altitude of the smartphone 200. The microphone 218 converts sounds into audio signals, and then provides the signals to the processor 202. The speaker 220 outputs sounds according to control of the processor 202. The battery 222 supplies power to the entire smartphone 200.

(Server)

The server 300 is provided with a processor 302, a memory 304, and a mobile communication device 306. Note that the server 300 is realized, for example, through cooperation between a plurality of server devices on a network; however, it will be described as a virtual single device herein for simplification of description. The processor 302 realizes various functions as it operates according to programs stored in the memory 304. The processor 302 of the server 300 executes various information processes according to, for example, requests received from the smartphone 200, and transmits results thereof to the smartphone 200. The memory 304 stores various kinds of data for operations of the server 300. For example, the memory 304 stores programs for the processor 302 to realize the various functions. Further, the memory 304 may temporarily or continuously store data uploaded from the smartphone 200. The mobile communication device 306 executes network communication via, for example, a mobile telephone network with a mobile communication device 208 included in the smartphone 200.

The configuration of the system 10 in an embodiment of the present disclosure has been described above. In the above description, the HMD 100 is an example of the wearable terminal. In the present embodiment, the wearable terminal may be any kinds of wearable terminals as long as it has the configuration capable of performing communication with an external device using two different communication modes. As one example, the wearable terminal according to the present embodiment may be a wristwatch type terminal. In addition, in the example described above, the HMD 100 is configured to allow a viewer to perceive an image by guiding image display light to the viewer's eye by the light guide plate 114, but the present embodiment is not limited thereto. In the present embodiment, an HMD of such a type that forms an image on a display surface, which is known as other type of HMD, may be used instead of the HMD 100. In this case, the image display light may be projected onto the display surface (in case of a projector), may be emitted by a light-emitting device arranged on the display surface (in case of an organic EL display), or may be one that is emitted from the light source arranged on the back or side of the display surface and is modulated on the display surface (in case of a liquid crystal display).

In addition, the system configuration described above is an example, and various other system configurations are also possible. For example, the HMD 100 may not necessarily have the display unit 110 and the control unit 160 separated from each other, and the entire configuration of the HMD 100 described above may be consolidated in a glasses-type housing such as the display unit 110. In addition, as described above, at least some of the functions for controlling the HMD 100 may be realized by the smartphone 200. Alternatively, the display unit 110 may also be provided with a processor and thus information processing of the HMD 100 may be realized in cooperation between the processor 162 of the control unit 160 and the processor of the display unit 110.

As another modified example, the system 10 may not include the smartphone 200, and communication may be directly executed between the HMD 100, and the server 300. In addition, in the above description, the smartphone 200 is an example of an external device that communicates with the HMD 100. The HMD 100 may communicate with other external devices than the smartphone 200. In the system 10, the smartphone 200 may be replaced by another device that can execute communication with both of the HMD 100 and the server 300, for example, a tablet terminal, a personal computer, a portable game device, or the like.

Although the above description is given of the case where the first communication device 165 and the second communication device 166 of the HMD 100 are separate devices, the present embodiment is not limited thereto. As one example, a single communication device may include a module that communicates using the first communication mode and a module that communicates using the second communication mode incorporated therein, and the first communication device 165 and the second communication device 166 may be configured to serve as one device. In this case, the power-saving process by communication function deactivation described above may be implemented by setting the state of any one module in a communication device to the power-saving or inactive state. In addition, the power-saving process during use of communication function described above may be implemented by allowing any one module in a communication device to communicate with the smartphone 200. The first communication device 205 and the second communication device 206 of the smartphone 200 may be similarly configured to serve as one device. In this way, in the present embodiment, the first communication device 165 and the second communication device 166 of the HMD 100 may have optional configurations. In addition, they may have a preferable configuration in which the execution of the communication function using the first communication mode (the first communication unit) and the communication function using the second communication mode (the second communication unit) is controlled separately. The following description will be given of the case where the first and second communication devices 165 and 166 of the HMD 100 are separate devices and the first and second communication devices 205 and 206 of the smartphone 200 are also separate devices, but this is only an example of the present embodiment. In the following description, the first communication devices 165 and 205 and the second communication devices 166 and 206 may be used interchangeably with the first communication unit and the second communication unit in the same device or different ones.

Figure 3:
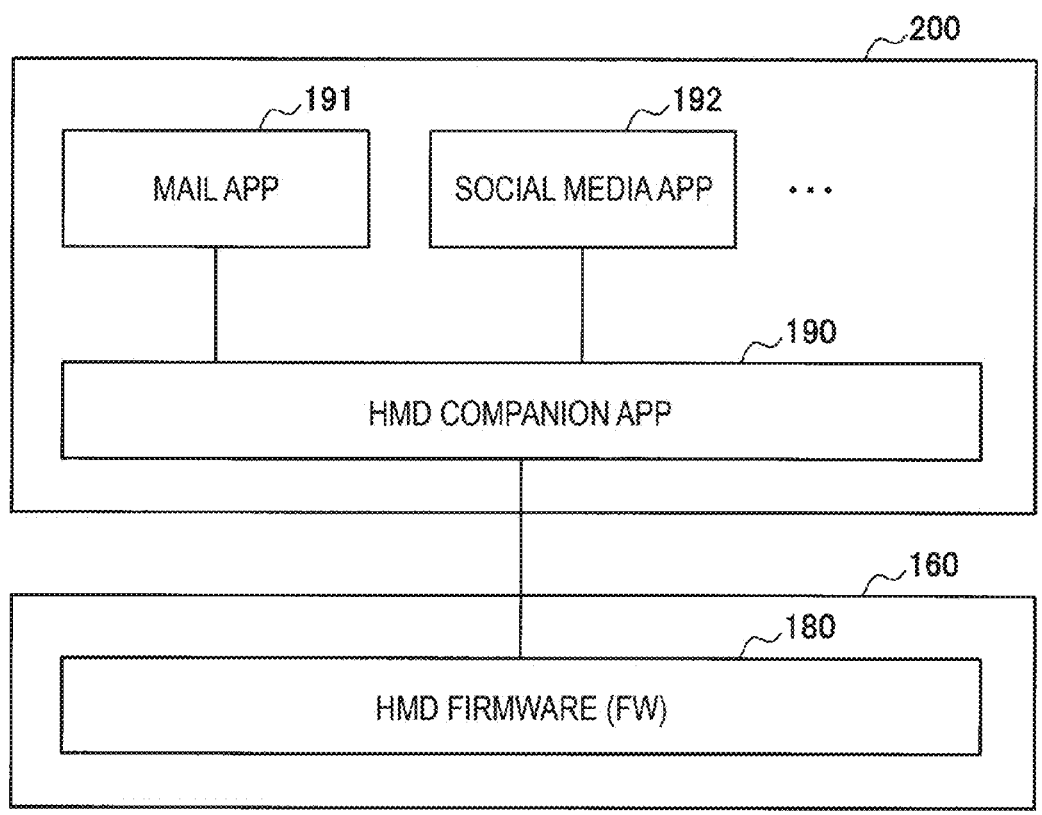
FIG. 3 is a schematic block diagram showing a software configuration of a control unit of an HMD and a smartphone.
Figure 4:
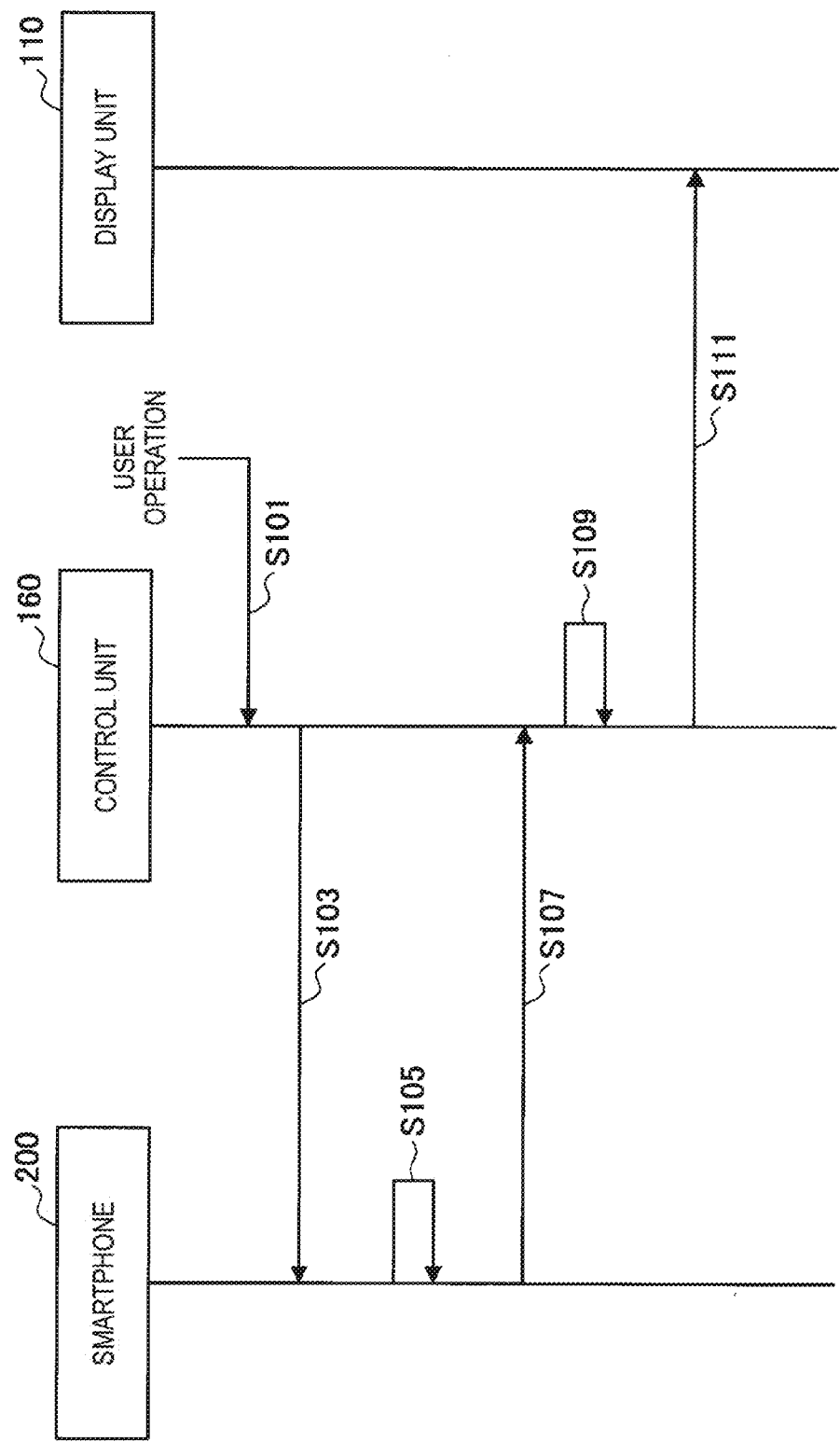
FIG. 4 is a diagram showing an exemplary information processing sequence in the system shown in FIG. 1

Referring to FIGS. 3 and 4, an example of information processing performed in the system 10 shown in FIG. 1 will be described. FIG. 3 is a schematic block diagram showing a software configuration of the control unit 160 of the HMD 100 and the smartphone 200. FIG. 4 is a diagram showing an example of the information processing sequence in the system 10 shown in FIG. 1.

Referring to FIG. 3, the control unit 160 includes firmware (FW) for driving the HMD 100 (an HMD firmware 180) installed therein. The HMD firmware 180 is stored in the memory 164 (e.g., ROM) of the control unit 160. The processor 162 operates in accordance with the HMD firmware 180 to implement various functions of the HMD 100.

On the other hand, the smartphone 200 includes the HMD companion app 190 that is application software for driving the HMD 100 installed therein. An instruction to cause the HMD firmware 180 to perform a given process is transmitted from the HMD companion app 190 to the HMD firmware 180 of the control unit 160, and thus the HMD 100 is driven so that the HMD firmware 180 performs the process. As one example, as shown in FIG. 3, various types of application software, such as a mail app 191 for running the mail software and a social media app 192 for utilizing various social media, is associated in the HMD companion app 190. As one example, when the mail software is activated, various instructions for activating the mail software are transmitted from the mail app 191 to the HMD firmware 180 of the control unit 160 through the HMD companion app 190, and the HMD 100 is driven so that the HMD firmware 180 activates the mail software. The HMD companion app 190 and various types of application software (the mail app 191 and the social media app 192 in the example shown in FIG. 3) are stored in the memory 204 (e.g., ROM) of the smartphone 200. The processor 202 operates in accordance with such software to transmit various instructions to the HMD 100.

Such an example of information processing performed between the HMD 100 and the smartphone 200 will be described with reference to FIG. 4. As one example, the processing procedure in a case where display on the display unit 110 is updated in response to an operation input performed by the user on the HMD 100 will be described.

Referring to FIG. 4, first, a user operation is input to the control unit 160 of the HMD 100 via the touch sensor 170 (S101). At that time, the processor 162 transmits information indicating the content of the user operation to the smartphone 200 using the first communication device 165 or the second communication device 166 (S103). The processor 202 of the smartphone 200 determines the content of an image to be displayed next based on the information from the HMD 100 received through the first communication device 205 or the second communication device 206 (S105). Although not illustrated, the processor 202 may communicate with the server 300 at that time using the mobile communication device 208 to acquire information necessary for the image to be displayed next.

Next, the processor 202 transmits the information necessary for the image to be displayed next, for example, an icon, text, or the like, to the HMD 100 using the first communication device 205 or the second communication device 206 (S107). The processor 162 of the HMD 100 generates the image to be displayed next (frame image) based on the information from the smartphone 200 received through the first communication device 165 or the second communication device 166 (S109). Further, the processor 162 controls the light source 112 of the display unit 110 based on data of the generated frame image, and thereby updates a frame of an image provided with image display light emitted from the light source 112 (S111).

An example of information processing performed in the system 10 shown in FIG. 1 has been described with reference to FIGS. 3 and 4.

(2. Communication Control)

The communication control according to the present embodiment will be described. As described above, in the communication control according to the present embodiment, the power-saving process during use of communication function and the power-saving process by communication function deactivation are performed in the HMD 100.

(2-1. Functional Configuration of Wearable Terminal)

Figure 5:
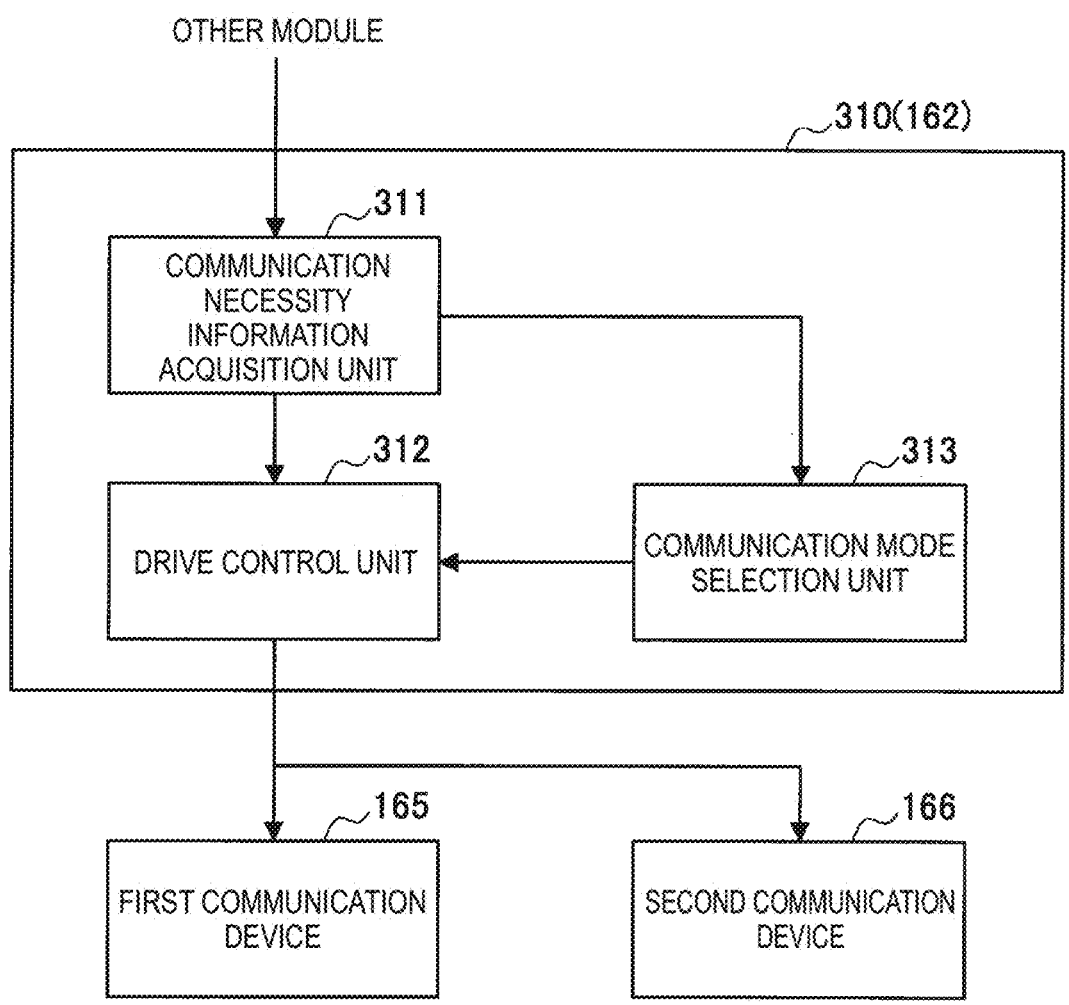
FIG. 5 is a functional block diagram showing an exemplary functional configuration for implementing communication control according to the present embodiment.

The functional configuration for implementing the communication control according to the present embodiment will be described with reference to FIG. 5. FIG. 5 is a functional block diagram showing an example of the functional configuration for implementing the communication control according to the present embodiment.

Referring to FIG. 5, the communication control according to the present embodiment is implemented by a controller 310 that is configured to include a communication necessity information acquisition unit 311, a drive control unit 312, and a communication mode selection unit 313. The controller 310 is composed of the processor 162 of the control unit 160. The processor 162 operates in accordance with a predetermined program to implement each function of the controller 310. In this way, the processor 162 can function as a communication control device for performing the communication control according to the present embodiment.

The communication necessity information acquisition unit 311 acquires communication necessity information indicating necessity to perform communication with the smartphone 200 that is an external device. In the present embodiment, the communication necessity information may be any types of information. As one example, the communication necessity information may be information indicating that the communication from the smartphone 200 to the HMD 100 is performed. As one example, the communication necessity information may be information indicating that a given application is activated, such as a case where it is necessary to communicate with the smartphone 200 to execute the application. In addition, as one example, the communication necessity information may be information indicating that a user's predetermined operation input that may be a kind of signal for currently performing communication is performed. The operation input may be an operation input indicating that a particular key (e.g., the input key 168 shown in FIG. 2) equipped in the control unit 160 is selected or may be a predetermined operation input, such as tapping and swiping operations, inputted through the touch panel 214. Furthermore, the operation input may be a voice input by the user through the microphone 218. The operation input is not limited to such examples, but may be set appropriately by the user, a designer of the system 10, or the like.

Some examples of the information that can be acquired as the communication necessity information are illustrated in the above, but the communication necessity information according to the present embodiment is not limited to such examples. In the present embodiment, the communication necessity information may be any information as long as the information indicates the necessity for communication. In addition, the communication necessity information acquisition unit 311 can acquire the communication necessity information from various types of modules (e.g., each component represented as blocks in FIG. 2) included in the HMD 100 and the smartphone 200.

The communication necessity information acquisition unit 311 transmits the acquired communication necessity information to the drive control unit 312 and the communication mode selection unit 313. In the present embodiment, when the communication necessity information is not acquired in a predetermined time, the communication necessity information acquisition unit 311 can transmits information indicating this fact (i.e., information indicating the fact that the communication necessity information is not acquired in a predetermined time) to the drive control unit 312.

The drive control unit 312 controls the drive of the first communication device 165 and the second communication device 166 on the basis of the communication necessity information acquired by the communication necessity information acquisition unit 311. In the present embodiment, the drive control unit 312 can control a drive state of the first communication device 165 and the second communication device 166 to be set to at least one of the active state that is capable of communicating with an external device, the power-saving state in which its power consumption is lower than that in the active state, and the inactive state in which power is shut off.

The active state may be a state in which communication is ready to be performed in the performance at a normal time in the communication mode, and its power consumption is relatively large even if communication is not actually performed. In the present embodiment, the first communication device 165 and the second communication device 166 when communication is performed are assumed to be set to the active state.

The power-saving state may be a state in which some functions of the first communication device 165 and the second communication device 166 are deactivated, and the power consumption in the power-saving state is lower than that in the active state. As one example, the power-saving state may be a state corresponding to sniff mode in Bluetooth or wake on wireless (WOW) mode in Wi-Fi. As one example, the transition (restoring) from the power-saving state to the active state may be performed immediately.

The inactive state may be a so-called power off state. The state transition from inactive to active states of the first communication device 165 and the second communication device 166 is necessary to take a longer time than the transition from power-saving to active states. However, in the inactive state, it is possible to reduce the power consumption of the first communication device 165 and the second communication device 166 to an extremely low level.

In the present embodiment, when the communication necessity information is not acquired in a predetermined time, the drive control unit 312 performs the power-saving process by communication function deactivation. Specifically, when the communication necessity information is not acquired in a predetermined time, the drive control unit 312 can set the first communication device 165 and the second communication device 166 to the power-saving state. In addition, when the communication necessity information is not acquired in a further predetermined time, the drive control unit 312 may set the first communication device 165 and the second communication device 166 to the inactive state. In addition, the drive control unit 312 may set only one of the first communication device 165 and the second communication device 166 to the power-saving state or the inactive state. In this way, in the present embodiment, if it is determined that there is no necessity for communication, the first communication device 165 and/or the second communication device 166 is gradually made inactive, and then the sequential transition to a low power consumption state is performed. This makes it possible to reduce the power consumption of the HMD 100 even more.

In addition, in the present embodiment, when the first communication device 165 and the second communication device 166 are all set to one of the power-saving state and the inactive state, the processor 162 of the control unit 160 may be subject to transition to the power-saving state. The power-saving state of the processor 162 is a state in which at least some functions of the processor 162 are inactive, and as one example, the power-saving state of the processor 162 may be a state in which a clock of the processor 162 is stopped (a so-called sleep state). In the power-saving state, it is possible to reduce the power consumption of the processor 162 to a level lower than that in a normal active state. In this way, the gradual deactivation of communication function of the first communication device 165 and/or the second communication device 166 and the transition of the processor 162 to the power-saving state make it possible to achieve further power saving of the HMD 100.

In this connection, the power-saving state of the processor 162 may be a state that is capable of performing immediate transition to the active state at a normal operation state by the communication from the first communication device 165 and the second communication device 166, a predetermined key operation, an input of an external signal. This makes it possible to activate the processor 162 immediately if necessary to perform the process even when the processor 162 is in the power-saving state, thereby eliminating the necessity for the user to wait until the process 162 activates.

When the first communication device 165 and the second communication device 166 are all set to one of the power-saving state and the inactive state and information that allows the processor 162 to operate is not inputted such as another operation input, the transition of the processor 162 to the power-saving state may be performed. This is because the processor 162 can have a function other than the communication control function, and thus when another operation input is performed, thus it is necessary for the processor 162 to perform various processes in response to the operation input.

In this connection, in the system 10 according to the present embodiment, the first communication device 165 may be configured to be set to the active state or the power-saving state but not to be set to the inactive state. This is because, even when a communication channel (communication path) using the first communication mode (e.g., Bluetooth) is typically established and a communication channel using the second communication mode (e.g., wireless LAN) is disconnected, the communication channel using the second communication mode is assumed to be reconnected by using the first communication mode, as a design concept of the system 10. Thus, in the present embodiment, the first communication device 165 is set to one of the active state and the power-saving state and is kept in a state capable of receiving communication from the outside. Even in the following description, the first communication device 165 is assumed not to be set to the inactive state. However, a drive state to which the first communication device 165 and the second communication device 166 are set is determined depending on the design of the system 10, but it is not limited thereto. As one example, the system 10 can be designed so that both the first communication device 165 and the second communication device 166 may perform transition to any one of the active state, the power-saving state, and the inactive state.

On the other hand, in the present embodiment, when the communication necessity information is acquired, the drive control unit 312 performs the power-saving process during use of communication function. Specifically, when the communication necessity information is acquired, the drive control unit 312 sets at least one of the first communication device 165 and the second communication device 166 to the active state to communicate with the smartphone 200. Then, the drive control unit 312 controls the drive of the first communication device 165 and/or the second communication device 166 that is set to the active state, thereby causing it to communicate with the smartphone 200.

As one example, when the predetermined communication necessity information is acquired, the drive control unit 312 may set at least one of the first communication device 165 and the second communication device 166 to the active state. The predetermined communication necessity information may be information indicating that communication from the smartphone 200 to the HMD 100 is performed or may be a predetermined operation input by the user (e.g., an operation input indicating that a particular key is selected, a predetermined operation input inputted through the touch panel 214, and a voice input by the user through the microphone 218) as described above. In addition, the first communication device 165 and/or the second communication device 166 may be set to the active state on the basis of the information, which indicates that communication from the smartphone 200 to the HMD 100 is performed. In this case, the drive control unit 312 may set one of the first communication device 165 and/or the second communication device 166 that is subject to the communication to the active state. Information as a trigger to set the first communication device 165 and/or the second communication device 166 to the active state is not limited to such examples, but may be defined appropriately by the user, a designer of the system 10, or the like.

As described above, when the predetermined communication necessity information is acquired, the drive control unit 312 can set one of the first communication device 165 and the second communication device 166 to the active state. However, the drive control unit 312 can set one of the first communication device 165 and the second communication device 166 to the active state depending on the communication mode selected by the communication mode selection unit 313 described later. In this time, the drive control unit 312 may set only a communication device corresponding to the communication mode selected by the communication mode selection unit 313 to the active state, and may set the other communication device to the power-saving state or the inactive state. This makes it possible for one of the first communication device 165 and the second communication device 166 that does not perform communication to be controlled to be set to a state having lower power consumption.

The communication mode selection unit 313 selects one of the first and second communication modes that is used to perform communication on the basis of the communication necessity information acquisition unit 311 communication necessity information. As one example, when predetermined communication necessity information is acquired, the communication mode selection unit 313 selects a communication mode that is associated with the predetermined communication necessity information. The association of the communication necessity information with the first and second communication modes may be previously defined depending on the types of an application that can be used by the HMD 100 as an example. As one example, in the HMD 100 according to the present embodiment, the use in which various applications are executed is assumed while exchanging voice information between the control unit 160 and the smartphone 200 using a hands-free profile (HFP) installed in Bluetooth. As one example, by inputting a voice to the microphone 172 of the control unit 160 by the user, text data can be inputted in response to the voice or an instruction to operate on a given application can be provided. In addition, it is possible to make a call using the control unit 160 as if it is a headset. Thus, when the information indicating that the application in which voice information can be exchanged between the control unit 160 and the smartphone 200 is activated is acquired as the communication necessity information, the communication mode selection unit 313 can select the first communication mode supporting Bluetooth, as an example. In this way, when activation of a given application or input of a predetermined operation, which is intended to specify a communication mode, is acquired as the communication necessity information, the communication mode selection unit 313 may select a communication mode that supports it.

Furthermore, as one example, when the information indicating that an application (e.g., a moving image playback application) necessitating a high-speed response to the user interface (UI) is activated is acquired as the communication necessity information, the communication mode selection unit 313 may select one of the first and second communication modes, which is smaller in communication delay than the other. As one example, it is known that the transmission control protocol (TCP) of the wireless LAN that can be applied as the second communication mode is smaller in communication delay than the radio frequency communication (RFCOMM) of Bluetooth that can be applied as the first communication mode. Thus, when the information indicating that the application necessitating a high-speed response to the user interface (UI) is activated is acquired as the communication necessity information, the communication mode selection unit 313 can select the second communication mode that supports the wireless LAN as an example.

Moreover, as one example, the communication mode selection unit 313 selects a communication mode on the basis of an amount of communication data or a transfer data rate, which is predicted from communication necessity information. Specifically, when it is predicted that a relatively large amount of communication data is transmitted or received or when it is predicted that communication is performed at a relatively high transfer data rate, the communication mode selection unit 313 can select the second communication mode in which data transfer can be performed at a higher rate on the basis of the acquired communication necessity information. This is because, if a communication mode having a low data transfer rate is selected when such a relatively large amount of data is transferred, it takes a time to perform communication and execution of the application is delayed, and thereby more likely to lead to the decrease in convenience for the user. An example of the case where the transmission and reception of a relatively large amount of communication data are predicted includes a case where information indicating that a large amount of file is attached to a mail intended be transmitted or received in the mail software is acquired as the communication necessity information. In addition, an example of the case where it is predicted that communication is performed at a relatively high transfer data rate includes a case where information indicating that an application for allowing the information transmission and reception to be continuously performed (at high rate) between the HMD 100 and the smartphone 200 is activated is acquired as the communication necessity information, such as an application for allowing a moving image to be captured by the camera 120.

In this connection, as one example, a case where information having a preset amount of communication data is transmitted from the HMD 100 to the smartphone 200 is considered. In this case, when the information is transmitted using the second communication mode, the power consumed during communication (during data transmission) becomes larger, while the information can be transmitted at higher transfer rate and accordingly it is possible to transmit the information at a shorter time. On the other hand, when the information is transmitted using the first communication mode, the power consumed during communication (during data transmission) can be kept smaller, while the information is transmitted at low transfer rate and accordingly it takes relatively long time to transmit the information. In this way, when information having a predetermined amount of communication data is transmitted or received, which one of the first and second communication modes is used to reduce the power consumption varies depending on the amount of communication data or the characteristics of communication mode. In the present embodiment, it is possible for the communication mode selection unit 313 to select a communication mode having lower power consumption, on the basis of the amount of communication data predicted from the communication necessity information in addition to the characteristics of the first and second communication modes described above.

However, even when the power consumption can be reduced to a low level, the extended time necessary for communication as described above is likely to damage convenience for the user. Thus, in the present embodiment, the communication mode selection unit 313 can select a communication mode by comprehensively considering the amount of communication data that is predicted to be used, the characteristics of the first and second communication modes (e.g., the maximum transfer data rate), and the time that is predicted to be necessary for communication.

The functional configuration for implementing the communication control according to the present embodiment has been described above with reference to FIG. 5. As described above, in the present embodiment, the drive state of the first communication device 165 and the second communication device 166 is controlled to be set to one of the active, power-saving, and inactive states by the drive control unit 312 on the basis of the communication necessity information. Thus, the drive state of the first communication device 165 and the second communication device 166 can be controlled to be set to a more appropriate state depending on the necessity for communication, thereby reducing the power consumption of the HMD 100.

It is possible to create a computer program for allowing the processor 162 to implement each function of communication control according to the present embodiment as described above and to install the computer program in a personal computer or the like. In addition, it is possible to provide a computer-readable recording medium that stores such a computer program therein. An example of the recording medium includes a magnetic disk, an optical disk, a magneto-optical disk, and a flash memory. In addition, the computer program may be delivered via a network without use of the recording medium.

(2-2. Processing Procedure for Method of Controlling Communication)

Figure 6:
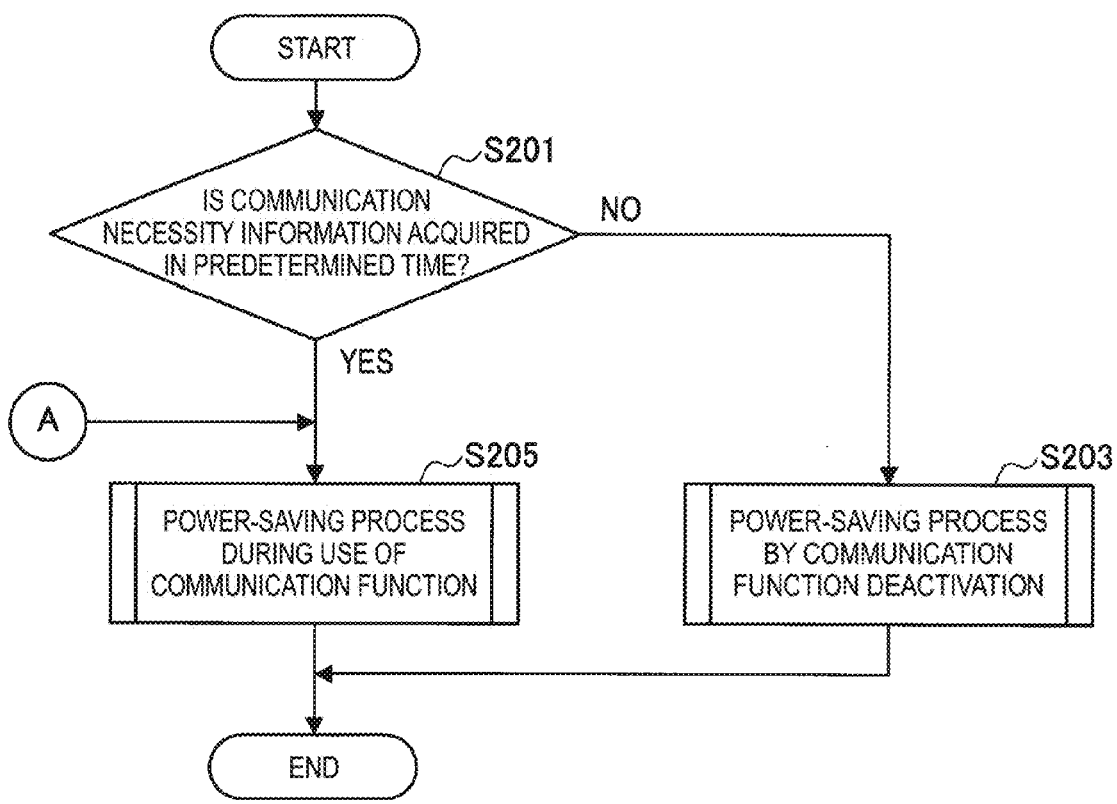
FIG. 6 is a flow diagram showing an exemplary processing procedure for a method of controlling communication according to the present embodiment.

The processing procedure for the method of controlling communication according to the present embodiment will be described with reference to FIG. 6. FIG. 6 is a flow diagram showing an exemplary processing procedure for the method of controlling communication according to the present embodiment. Each processing step shown in FIG. 6 may be implemented by each function of the controller 310 shown in FIG. 5.

Referring to FIG. 6, in the method of controlling communication according to the present embodiment, whether the communication necessity information is acquired in a predetermined time is determined (step S201). This process may be performed, as one example, by the communication necessity information acquisition unit 311 shown in FIG. 5 as described above.

If the communication necessity information is not acquired in step S201 by the communication necessity information acquisition unit 311 in a predetermined time, then the information indicating this fact is provided from the communication necessity information acquisition unit 311 to the drive control unit 312, and the power-saving process by communication function deactivation is initiated (step S203). On the other hand, if the communication necessity information is acquired in step S201 by the communication necessity information acquisition unit 311 in a predetermined time, then the acquired communication necessity information is provided to the drive control unit 312 and the communication mode selection unit 313, and the power-saving process during use of communication function is initiated (step S205).

The processing procedure for the method of controlling communication according to the present embodiment has been described with reference to FIG. 6. In the following, the power-saving process by communication function deactivation shown in step S203 of FIG. 6 and the power-saving process during use of communication function shown in step S205 of FIG. 6 will be described in more detail in item (3. Power-saving process by communication function deactivation) and item (4. Power-saving process during use of communication function) below, respectively.

(3. Power-Saving Process by Communication Function Deactivation)

Figure 7:
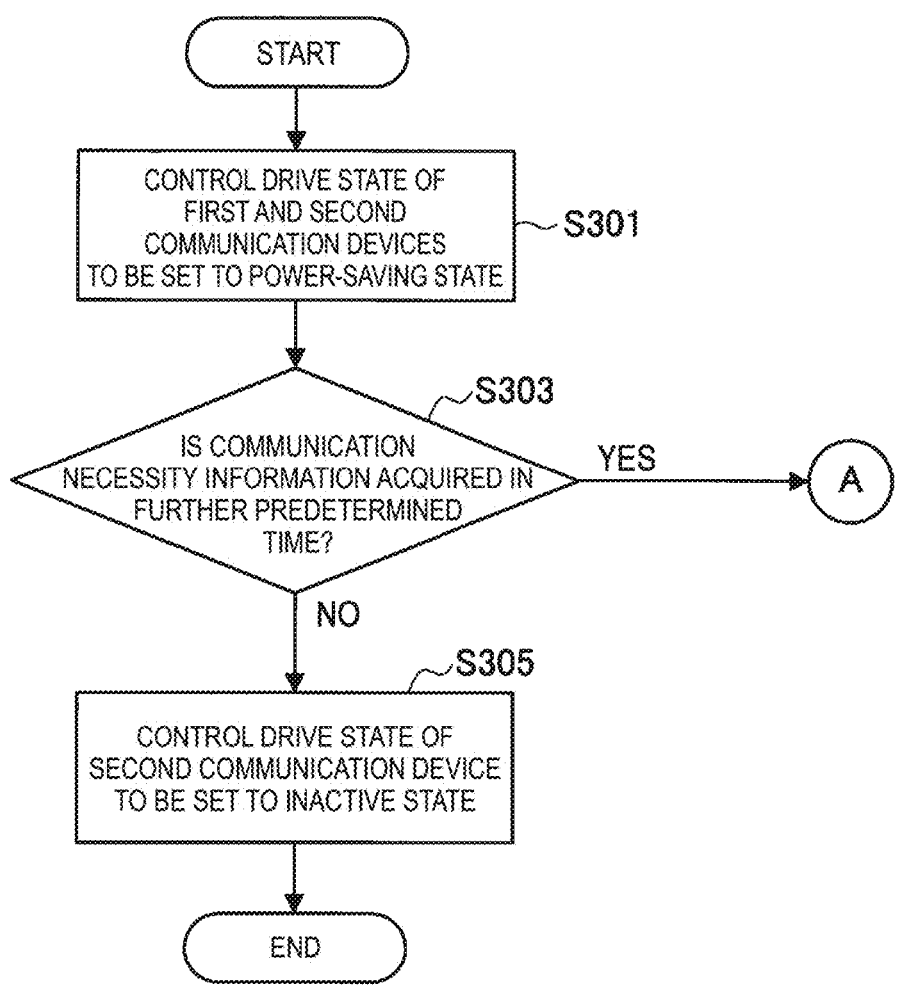
FIG. 7 is a flow diagram showing an exemplary processing procedure for a power-saving process by communication function deactivation according to the present embodiment.

The power-saving process by communication function deactivation according to the present embodiment will be described with reference to FIG. 7. FIG. 7 is a flow diagram showing an exemplary processing procedure for the power-saving process by communication function deactivation according to the present embodiment. Each processing step shown in FIG. 7 may be implemented by each function of the controller 310 shown in FIG. 5.

Referring to FIG. 7, in the power-saving process by communication function deactivation according to the present embodiment, the drive state of the first communication device 165 and the second communication device 166 is controlled to be set to the power-saving state (step S301). This process may be performed, as one example, by the drive control unit 312 shown in FIG. 5 as described above.

Then, whether the communication necessity information is acquired in a predetermined time is further determined (step S303). This process may be performed, as one example, by the communication necessity information acquisition unit 311 shown in FIG. 5 as described above.

If the communication necessity information is acquired in step S303 by the communication necessity information acquisition unit 311 in a predetermined time, then the acquired communication necessity information is provided to the drive control unit 312 and the communication mode selection unit 313, and the power-saving process during use of communication function described in step S205 of FIG. 6 is initiated.

On the other hand, if the communication necessity information is not acquired in step S303 by the communication necessity information acquisition unit 311 in a predetermined time, then the information indicating this fact is provided from the communication necessity information acquisition unit 311 to the drive control unit 312, and the drive state of the second communication device 166 is controlled to be set to the inactive state (step S305). In the example shown in FIG. 6, the drive state of only the second communication device 166 is controlled to be set to the inactive state in step S305, but as described above, the first communication device 165 also may be set to the inactive state depending on the configuration of the system 10.

The power-saving process by communication function deactivation according to the present embodiment has been described with reference to FIG. 7. As described above, in the present embodiment, if the communication necessity information is not acquired in a predetermined time, the first communication device 165 and the second communication device 166 may be set to the power-saving state. In addition, further, if the communication necessity information is not acquired in a predetermined time, the first communication device 165 and the second communication device 166 may be set to the inactive state. In this way, if it is determined that there is no necessity for communication, it is possible to reduce the power consumption of the HMD 100 by gradually deactivating the function of the first communication device 165 and the second communication device 166.

Figure 8:
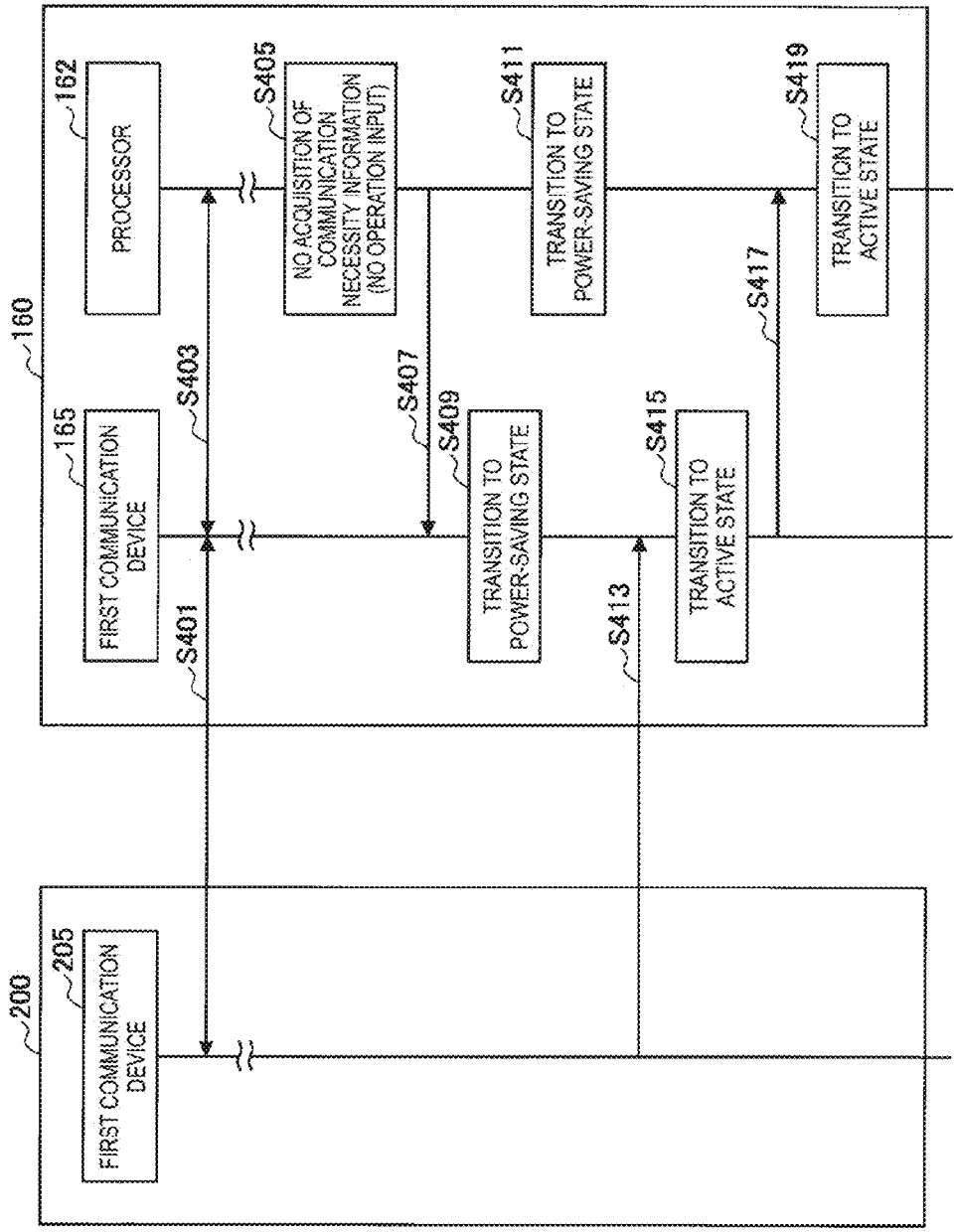
FIG. 8 is a sequence diagram showing an exemplary processing procedure when a processor performs transition to power-saving state in the power-saving process by communication function deactivation according to the present embodiment.

In this connection, as described above, in the power-saving process by communication function deactivation according to the present embodiment, the first communication device 165 and the second communication device 166 are set to the inactive state and the processor 162 also may perform transition to the power-saving state. The processing procedure when the processor 162 performs transition to the power-saving state in the power-saving process by communication function deactivation according to the present embodiment will be described with reference to FIG. 8. FIG. 8 is a sequence diagram showing an exemplary processing procedure when the processor 162 performs transition to the power-saving state in the power-saving process by communication function deactivation according to the present embodiment. In FIG. 8, as one example, the processing procedure when communication is performed via the first communication devices 165 and 205 using the first communication mode between the control unit 160 of the HMD 100 and the smartphone 200 is illustrated. Even when communication is performed via the second communication devices 166 and 206 using the first communication mode, a similar processing procedure may be performed.

Referring to FIG. 8, the process shown in steps S401 and S403 indicates a process performed when the first communication devices 165 and 205 and the processor 162 are all activated, various types of information is repeatedly exchanged between the processor 162 of the control unit 160 and the processor 202 of the smartphone 200 (not shown in FIG. 8), and various applications are executed as an example. In other words, the communication is performed between the first communication device 165 of the control unit 160 and the first communication device 205 of the smartphone 200 (step S401), and at the same time, the communication is performed between the first communication device 165 and the processor 162 in the control unit 160 (step S403). As one example, the communication between the first communication device 165 and the first communication device 205 shown in step S401 may be communication using the RFCOMM that is a Bluetooth protocol. While the application is executed, the process shown in steps S401 and S403 is repeatedly performed.

When execution of the application is terminated and there is no communication from the outside or operation input by the user in a predetermined time, the processor 162 detects that the communication necessity information is not acquired in a predetermined time (step S405). This process corresponds to the process shown in step S201 of FIG. 6 and is performed by the communication necessity information acquisition unit 311 shown in FIG. 5 as an example.

In the processor 162, the drive control unit 312 determines that the first communication device 165 is set to the power-saving state on the basis of the information indicating that the communication necessity information is not acquired in a predetermined time. Then, the drive control unit 312 of the processor 162 transmits a request (instruction) to perform transition to the power-saving state to the first communication device 165 (step S407). The first communication device 165, when receiving the request, performs transition to the power-saving state (step S409).

On the other hand, when the communication necessity information is not acquired even after the process in step S407 is performed and other information such as operation inputs is not inputted, the processor 162 performs transition to the power-saving state (step S411). As described above, the power-saving state may be a so-called sleep state or may be a state in which a clock is stopped as an example.

The subsequent process corresponds to a process for allowing the first communication device 165 and the processor 162 to be activated. The communication from the first communication device 205 of the smartphone 200 to the first communication device 165 of the control unit 160 is assumed to be performed when the first communication device 165 and the processor 162 are all set to the power-saving state (step S413). This communication may be a notification (Notify) used to notify the communication to the control unit 160. The first communication device 205, when receiving the notification (Notify), performs transition to the active state (step S415). The processor 162 is set to the power-saving state at step S415, and thus the transition of the first communication device 205 to the active state fails to be performed under the control by the processor 162. Thus, as one example, a component having a function to perform transition from the power-saving state to the active state upon reception of a signal from the outside, such as an electric circuit mechanism or a separate processor, may be installed in the first communication device 205. The first communication device 205 may autonomously perform transition to the active state using such component in step S415.

The first communication device 205 that is in the active state transmits the information indicating that there is communication from the smartphone 200 (or the received information just as it is) to the processor 162 (step S417). The processor 162, when receiving the information, performs transition to the active state (step S419). Then, the communication between the processor 162 of the control unit 160 and the processor 202 of the smartphone 200 via the first communication devices 165 and 205 is assumed to be performed again as shown in steps S401 and S403 as an example.

The processing procedure when the processor 162 performs transition to the power-saving state in the power-saving process by communication function deactivation according to the present embodiment has been described with reference to FIG. 8. As described above, in the present embodiment, when there is no necessity for communication, the first communication device 165 and the processor 162 are all set to the power-saving state, and thus it is possible to reduce the power consumption of the HMD 100 even more.

In the example shown in FIG. 8, the processor 162 performs transition from the power-saving state to the active state by performing the communication from the first communication device 165, but the present embodiment is not limited thereto. As one example, when there is an operation input indicating that a particular key (e.g., the input key 168 shown in FIG. 2) is selected or a particular operation input inputted through the touch panel 214, the processor 162 may perform transition to the active state. Alternatively, when there is a voice input by the user through the microphone 218, the processor 162 may perform transition to the active state. In this way, the operation input for allowing the processor 162 to perform transition to the active state is optional, or may be set appropriately by the user, a designer of the system 10, or the like. However, as the operation input for allowing the processor 162 to perform transition to the active state, an operation input that can be detected by an electric circuit mechanism or the like may be selected even when the processor 162 is in the power-saving state. As one example, for a voice input, a mechanism in which a circuit composed of an operational amplifier is appropriately arranged may be implemented as an autonomous mechanism independent of the control by the processor 162. This mechanism is configured to compare a voltage value of a voice signal corresponding to the inputted sound with a predetermined threshold value, and, if the voltage value of the voice signal is greater than the threshold value, input the voice signal to the processor 162.

(4. Power-Saving Process During Use of Communication Function)

Figure 9:
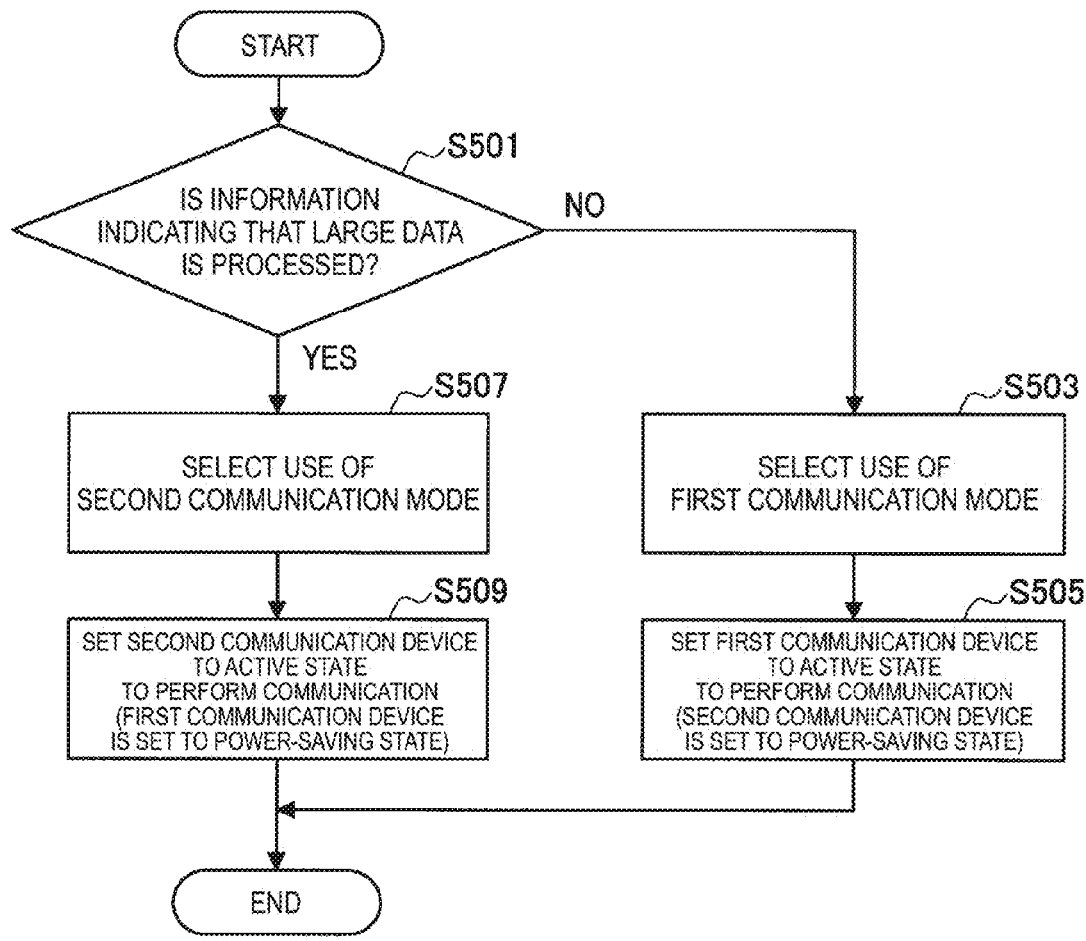
FIG. 9 is a flow diagram showing an exemplary processing procedure for a power-saving process during use of communication function according to the present embodiment.

The power-saving process during use of communication function according to the present embodiment will be described with reference to FIG. 9. FIG. 9 is a flow diagram showing an exemplary processing procedure for the power-saving process during use of communication function according to the present embodiment. Each process step shown in FIG. 9 may be implemented by each function of the controller 310 shown in FIG. 5.

Referring to FIG. 9, in the power-saving process during use of communication function according to the present embodiment, it is determined whether the communication necessity information is the information indicating that large data is to be processed (step S501). The process shown in step S501 may be performed, as an example, by the communication mode selection unit 313 shown in FIG. 5. Specifically, the process shown in step S501 may be a process of determining whether a predicted amount of communication data is greater than a predetermined threshold value (or is greater than or equal to a predetermined threshold value) on the basis of the communication necessity information. The predetermined threshold value may be set appropriately so that the data communication is performed with lower power consumption and is performed in a time at which the user's convenience is not impaired, depending on the characteristics (e.g., the maximum transfer data rate) of the first and second communication modes. In addition, the information indicating that large data is to be processed may be information indicating that a given application is activated, such as an application for capturing a moving image.

If it is not determined in step S501 that the communication necessity information is the information indicating that large data is to be processed, the communication mode selection unit 313 selects communication that is performed using the first communication mode capable of performing data transfer at low rate with lower power consumption (step S503). Then, the first communication device 165 is set to the active state and communication is performed by the drive control unit 312 (step S505). In step S505, the drive control unit 312 may set only the first communication device 165 that performs communication to the active state, but may set the second communication device 166 that does not perform communication to the power-saving state or the inactive state.

On the other hand, if it is determined in step S501 that the communication necessity information is the information indicating that large data is to be processed, the communication mode selection unit 313 selects communication that is performed using the second communication mode capable of performing data transfer at a higher rate (step S507). Then, the second communication device 166 is set to the active state and communication is performed by the drive control unit 312 (step S509). In step S509, the drive control unit 312 may set only the second communication device 166 that performs communication to the active state, but may set the first communication device 165 that does not perform communication to the power-saving state or the inactive state.

The power-saving process during use of communication function according to the present embodiment has been described with reference to FIG. 9. The process shown in step S501 of FIG. 9 is an example of a determination process for selecting a communication mode by the communication mode selection unit 313. The present embodiment is not limited to the example shown in FIG. 9, and the communication mode selection unit 313 may determine a communication mode on the basis of another determination criterion. Other examples of the criterion for determination by the communication mode selection unit 313 are described above with reference to FIG. 5 in the above item (2-1. Functional configuration of wearable terminal), and thus the description thereof will be omitted. The determination criterion for selecting a communication mode by the communication mode selection unit 313 may be set appropriately by the user, a designer of the system 10, or the like.

As described above, in the present embodiment, it is possible to select a communication mode to be used for communication between the control unit 160 and the smartphone 200 on the basis of the communication necessity information. The communication mode can be selected so that the communication is performed with lower power consumption and the communication is performed in a time at which the user's convenience is not impaired, depending on the necessity for communication. Thus, as one example, the second communication mode in which the power consumed is large may be used only for relatively large data and the first communication mode in which the power consumed is small may be used for other cases. Thus, the low power consumption of the HMD 100 is achieved. In addition, switching between the first communication mode and the second communication mode (a series of processes shown in FIG. 9) is performed automatically by the processor 162 without the user's consciousness. Thus, the necessity for a troublesome switching process between communication modes performed directly by the user is eliminated, and the communication modes are automatically switched so that the time taken for the communication is not extended, thereby improving the user's convenience.

(5. Application Example)

A specific application example for the communication control according to the present embodiment described above will be described. As one application example, in the case where the application for moving-image capture is executed, the communication control between the control unit 160 of the HMD 100 and the smartphone 200 will be described.

As described above, in the present embodiment, when the information indicating that the application for moving-image capture as an example is activated is acquired as the communication necessity information, the communication mode may be switched to the second communication mode that can transfer data at a higher rate. In this description, an example of a display presented to the user in the display unit 110 of the HMD 100 when an application is selected and the communication performed between the HMD 100 and the smartphone 200 while a moving image is being captured using the application for moving-image capture will be described in detail with reference to FIGS. 10 and 11.

Figure 10:
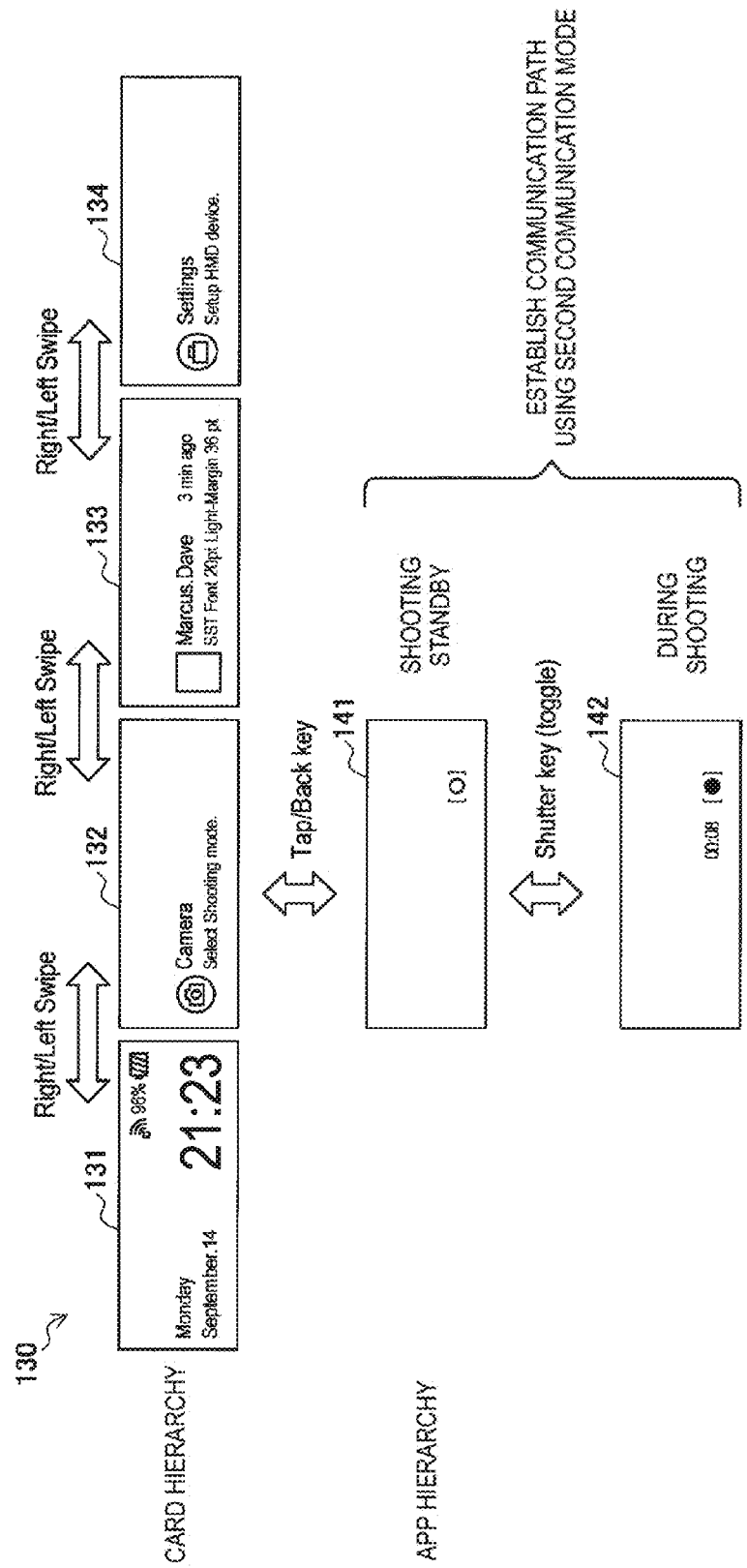
FIG. 10 is a diagram showing an exemplary display presented to the user when an application is selected.

FIG. 10 is a diagram showing an exemplary display presented to the user when an application is selected. FIG. 10 illustrates a display example of the display unit 110 of the HMD 100.

Referring to FIG. 10, several display examples in a display area 130 corresponding to the front of the eyes of the user of the display unit 110 are illustrated. In the present embodiment, a display on the display unit 110 has a hierarchy structure including a card hierarchy in which a display called "card" in the display area 130 is produced and an app hierarchy in which a display when an application is executed in the display area 130 is produced.

In the card hierarchy, a display of several cards can be switched sequentially by a swipe operation on the touch sensor 170 of the control unit 160 as an example. One card is set to correspond to one application or function, and the user is able to search an application to be activated or a function to be executed while switching a display of the cards. In the example shown in FIG. 10, a card that represents a home screen 131, a card that represents an application for moving-image capture 132, a card that represents an application for social media 133, and a card that represents a setting screen for performing various settings 134 are shown as an exemplary card.

The user is able to perform an operation input indicative of selection of the card, such as a tapping operation on the touch sensor 170 and a depression operation of the input key 168, in the state in which a card corresponding to an application to be activated or a function to be executed is displayed on the display area 130. Such operation allows a corresponding application to be activated or a corresponding function to be executed.

As one example, the operation input indicative of selection of the card is assumed to be performed by the user in the state in which a card representing an application for moving-image capture 132 is displayed on the display area 130. Then, the application for moving-image capture is activated, and a display of the display area 130 is switched to a shooting standby display 141 that is a display corresponding to the application, as shown in FIG. 10. The shooting standby display 141 is a display that belongs to the app hierarchy described above. A predetermined operation input, such as depression of the input key 168 to which a function for returning a hierarchy is assigned (also referred to as "back key"), may be performed to return the display from the app hierarchy to the card hierarchy.

In the shooting standby display 141, if the input key 168 to which a shutter function is assigned (also referred to as "shutter key") is selected, a display of the display area 130 is switched to a shooting display 142 indicating that shooting of a moving image is performed. When the shooting is intended to be stopped, a predetermined operation input, such as depression of the shutter key again, may be performed. Such operation input allows the shooting to be stopped and a display of the display area 130 to be returned to the shooting standby display 141.

In this description, while a display belonging to the app hierarchy (shooting standby display 141 and the shooting display 142) is displayed on the display area 130, the application for moving-image capture is regarded as being in the activated state. Thus, in the example shown in FIG. 10, while the shooting standby display 141 and the shooting display 142 are displayed on the display area 130, a communication path of the second communication mode is established and communication using the second communication mode is ready to be executable.

Figure 11:
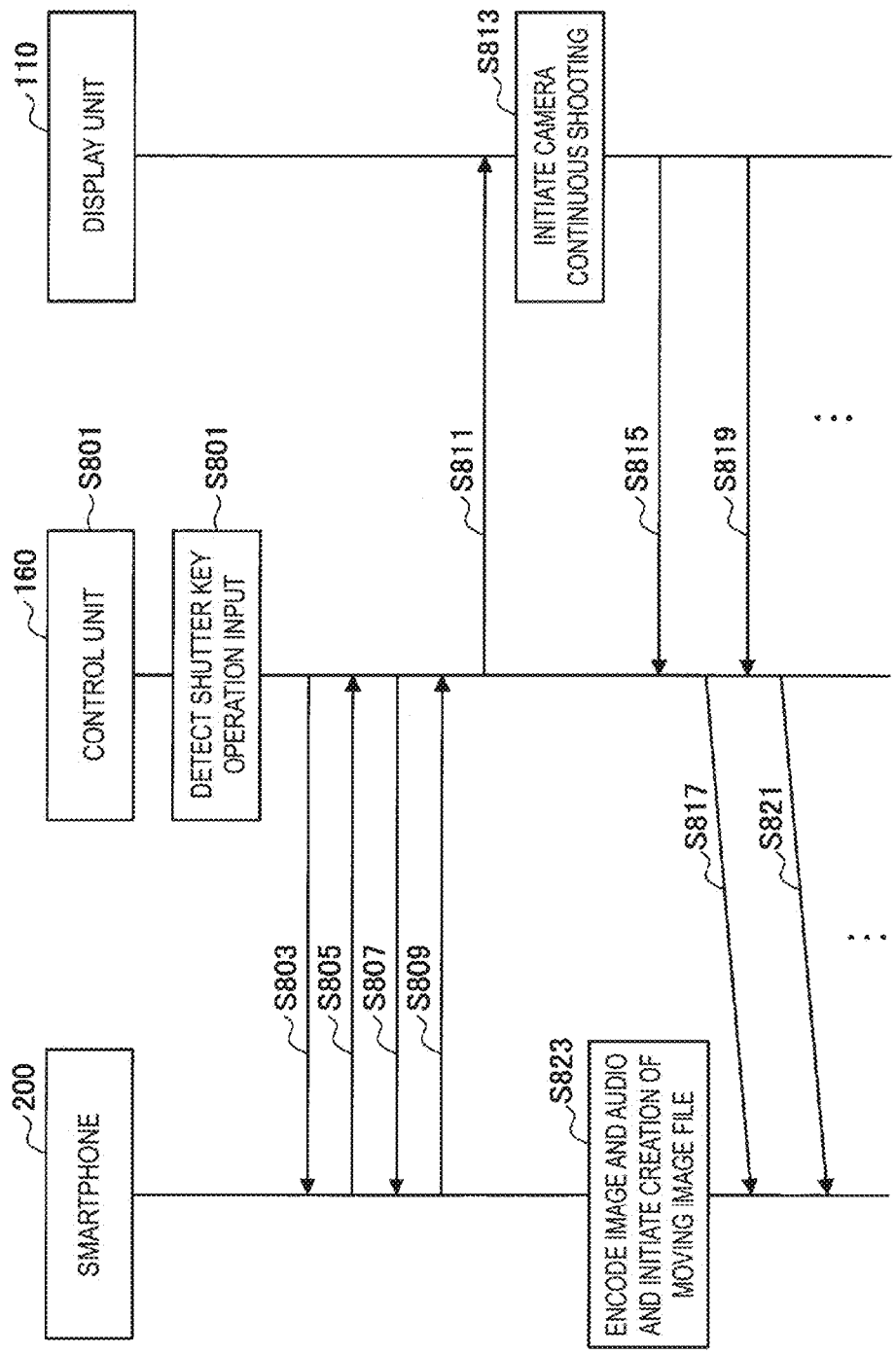
FIG. 11 is a sequence diagram showing an exemplary procedure for processing various types of information of the HMD and the smartphone during shooting of a moving image by an application for moving-image capture.

FIG. 11 is a sequence diagram showing an exemplary procedure for processing various types of information of the HMD 100 and the smartphone 200 during shooting of a moving image by the application for moving-image capture. In FIG. 11, information exchange among the display unit 110 of the HMD 100, the control unit 160 of the HMD 100, and the smartphone 200 is illustrated.

In the state in which the application for moving-image capture is activated and the shooting standby display 141 is displayed on the display area 130, an input of the shutter key operation is detected (step S801). When the input of the shutter key operation is detected, information indicating this fact is transmitted from the control unit 160 to the smartphone 200 (step S803).

Figure 13:
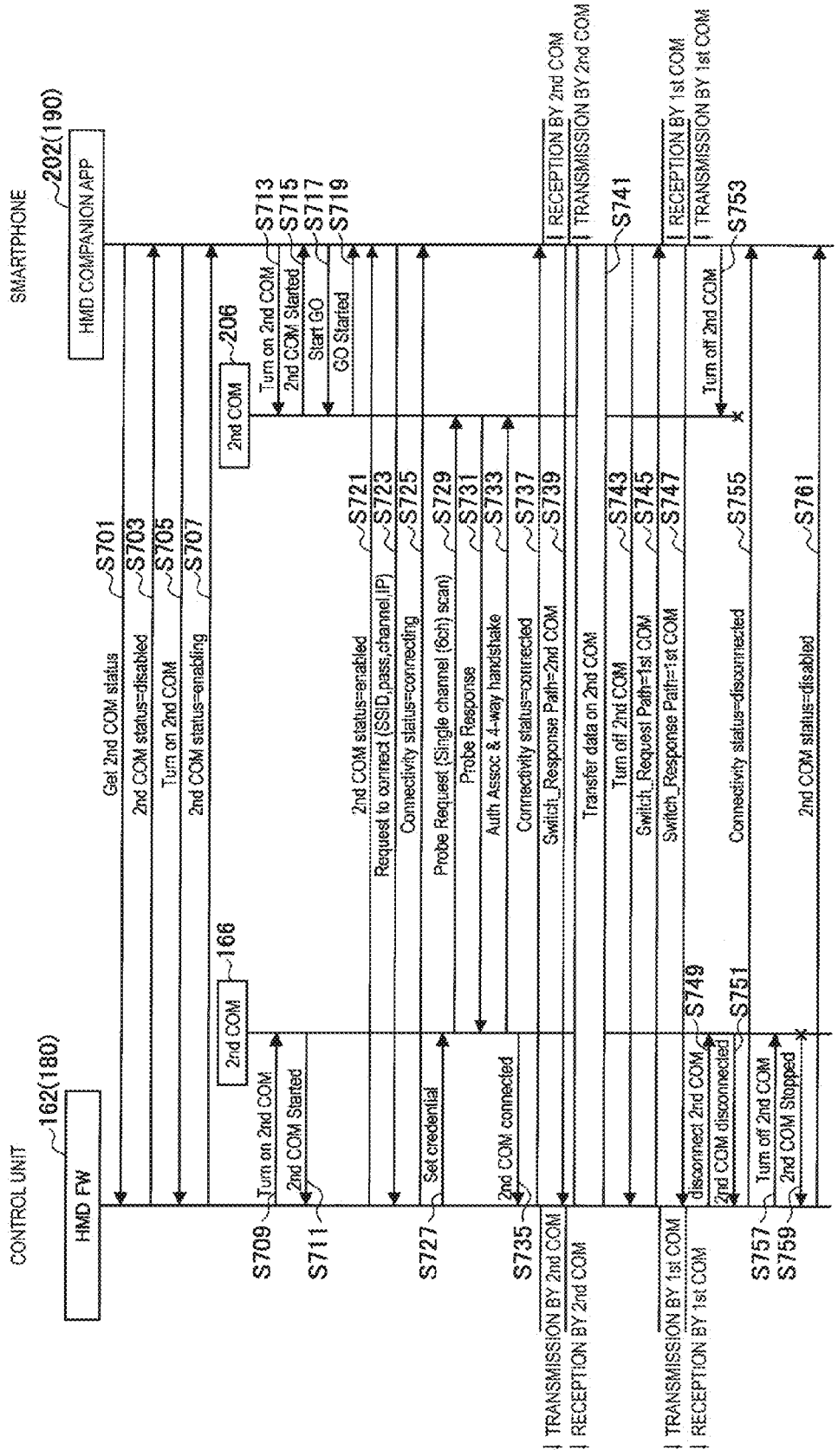
FIG. 13 is a sequence diagram showing an example of a more specific processing procedure for the authentication process for communication in the second communication mode using the first communication mode.

In response to the information transmitted from the control unit 160, a request indicating that transmission of audio streams is initiated is transmitted from the smartphone 200 to the control unit 160 (step S805). In response to the request, audio data that is acquired by the microphone 172 of the control unit 160 (i.e., audio data that can be acquired during moving image shooting) is transmitted from the control unit 160 to the smartphone 200 in the form of audio streams (step S807). FIG. 13 illustrates only one arrow corresponding to the process shown in step S807 as a representative example, but the transmission of audio streams from the control unit 160 to the smartphone 200 is continuously performed while the shooting of a moving image is performed.

In the present embodiment, the first communication mode may be used for the transmission of audio data from the control unit 160 to the smartphone 200. As one example, the HFP installed in Bluetooth as an example of the first communication mode may be applied preferably for the transmission of audio data.

Concurrently with the process shown in step S805, a request indicating that shooting is initiated by the camera 120 equipped in the display unit 110 is transmitted from the smartphone 200 to the control unit 160 (step S809). In the process shown in step S809, the frame rate (e.g., approximately 15 frames per second (fps)) in the shooting may also be together transmitted.

Subsequently, a request to initiate the shooting is transmitted from the control unit 160 to the display unit 110 (step S811). Then, the shooting is performed with the camera 120 of the display unit 110 at the specified frame rate (step S813).

In this connection, the moving image may be regarded as being obtained by continuously shooting still images. In the present embodiment, the camera 120 performs continuous shooting of an image in accordance with the specified frame rate, and the captured image data is transmitted to the control unit 160 sequentially for each frame (step S815) and then is transmitted from the control unit 160 to the smartphone 200 (step S817). Similarly, for a second and subsequent images, the image data is transmitted from the display unit 110 to the control unit 160 for each frame (step S819), and is transmitted from the control unit 160 to the smartphone 200 (step S821).

The audio data is transmitted to the smartphone 200 at any time by the process shown in step S807, and the image data is transmitted to the smartphone 200 at any time by the process following the step S815. The smartphone 200 performs a process of encoding image and audio on the audio data and the image data and performs a process of creating a moving image file (step S823).

In the present embodiment, the second communication mode may be used for the transmission of image data from the control unit 160 to the smartphone 200. The image data is a relatively large amount of data, and the image data is transmitted from the control unit 160 to the smartphone 200 sequentially at a predetermined interval (e.g., 15 fps) during moving image shooting. Thus, the use of the second communication mode capable of performing data transfer at a higher rate in transmitting the image data makes it possible to prevent delay in the moving image generation process due to communication delay, thereby improving the user's convenience.

The application example of the communication control according to the present embodiment has been described. As described above, in the present embodiment, when the information indicating that a given application such as the application for moving-image capture is to be initiated is acquired as the communication necessity information, the communication mode may be switched to the second communication mode capable of performing data transfer at a higher rate. However, when the application is performed, the first communication mode and the second communication mode may be used selectively in a suitable manner depending on the type of information transmitted and received. As one example, as the example described above, the audio data may be transmitted using the first communication mode and the image data may be transmitted using the second communication mode during moving image shooting. The selection of a more suitable communication mode depending on the type of information allows an operation of application to be performed more smoothly in addition to the reduction of power consumption.

(6. Modified Example)

Several modified examples of the embodiments described above will be described.

(6-1. Communication Authentication Process)

Although the power-saving process by communication function deactivation and the power-saving process during use of communication function according to the present embodiment have been described above, these processes are all based on the assumption that a process of authenticating communication between devices is performed and a communication path is established for both the first communication mode and the second communication mode. The present modified example is related to the authentication process in the communication using the first communication mode and the second communication mode, which is performed in a stage preceding the these processes. Specifically, in the present modified example, the authentication process in the communication using the second communication mode is performed by the communication using the first communication mode.

The authentication process in communications varies depending on communication modes. However, in such an authentication process, the devices being in communication are caused to be recognized from each other and the user is necessary to input information, such as ID, password, and encryption key, manually to the devices, and thus, sometimes this is far from an easy task. On the other hand, in the present modified example, the authentication process is performed in the second communication mode using the first communication mode as described above, and thus, if one authentication process using the first communication mode is performed, the other authentication process using the second communication mode can be automatically performed without the intervention of the user, thereby improving the user's convenience. In particular, when Bluetooth is used as the first communication mode and wireless LAN is used as the second communication mode, the effects described above can be obtained more appropriately. This is because, the authentication process in Bluetooth necessitates a task referred to as paring, but the pairing is a relatively easy task while the authentication process in wireless LAN necessitates a relatively complicated task.

Figure 12:
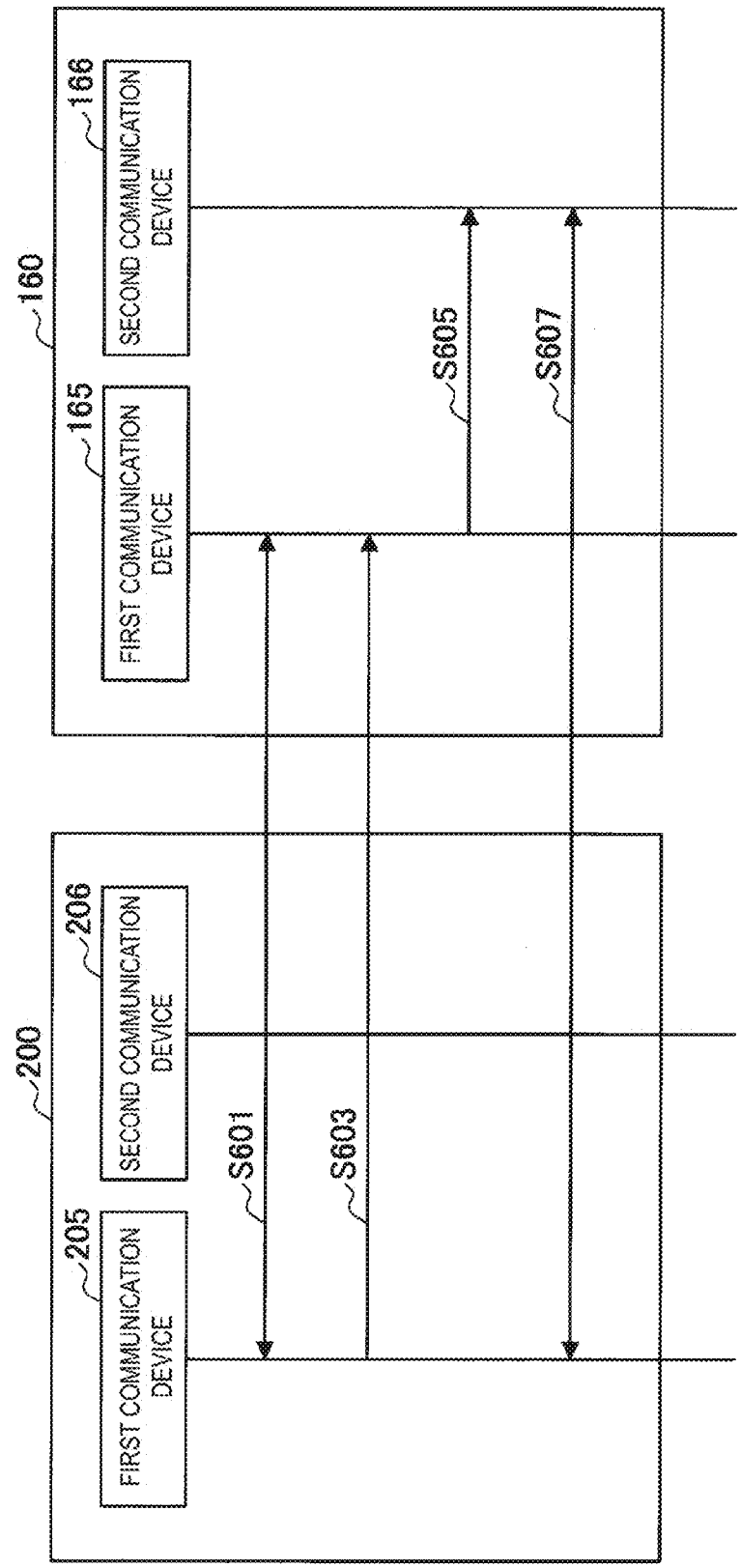
FIG. 12 is a sequence diagram showing an exemplary processing procedure for an authentication process for communication in the second communication mode using the first communication mode.

The authentication process for communication in the second communication mode using the first communication mode will be described with reference to FIG. 12. FIG. 12 is a sequence diagram showing an exemplary processing procedure for the authentication process for communication in the second communication mode using the first communication mode.

Referring to FIG. 12, the communication through the first communication mode is authenticated and the communication path is established between the first communication device 165 of the control unit 160 of the HMD 100 and the first communication device 205 of the smartphone 200 by the user's operation (step S601). This process may be a process for establishing a communication path using Bluetooth between the control unit 160 and the smartphone 200 by performing paring as an example.

Subsequently, various types of information (e.g., IDs, passwords, and encryption keys) used to authenticate the communication through the second communication mode from the first communication device 205 of the smartphone 200 to the first communication device 165 of the control unit 160 are transmitted (step S603). In the control unit 160, the information described above is transmitted from the first communication device 165 to the second communication device 166 (step S605). Then, on the basis of the information transmitted through the first communication mode from the smartphone 200, the communication between the second communication device 166 of the control unit 160 and the second communication device 206 of the smartphone 200 is authenticated, and the communication path is established between them (step S607).

The authentication process for communication in the second communication mode using the first communication mode has been described with reference to FIG. 12. As described above, in the present modified example, various types of information used to authenticate the communication in the second communication mode using the first communication mode is transmitted, and the communication path for the second communication mode is established on the basis of the information. In this connection, the process shown in steps S603 to S607 may be automatically performed under the control by the processors 162 and 202 of the control unit 160 and the smartphone 200 respectively, without a particular operation input by the user. Thus, the task performed by the user makes it possible to reduce not only the authentication process for the first communication mode but also the burden on the user. As the first communication mode, by setting a communication mode in which an operation necessary for the authentication process is relatively easy, the burden on the user is further reduced.

A specific processing procedure in the sequence diagram shown in FIG. 12 will be described with reference to FIG. 13. FIG. 13 is a sequence diagram showing an example of a more specific processing procedure for the authentication process for communication in the second communication mode using the first communication mode.

FIG. 13 illustrates the processing procedure when the power-saving process by communication function deactivation and the power-saving process during use of communication function are performed after the authentication process for communication in the second communication mode using the first communication mode is performed and the communication path in the two communication modes is established. In addition, FIG. 13 illustrates a processing procedure after the authentication process in the communication through the first communication mode is already performed and the communication path by the first communication mode is established. In addition, in FIG. 13, the first communication mode is abbreviated as "1st COM", and the second communication mode and the second communication devices 166 and 206 are abbreviated to "2nd COM", for simplification of illustration.

Referring to FIG. 13, information exchange between the processor 162 (having a function of the HMD firmware 180 shown in FIG. 3 installed therein) of the control unit 160 and the processor 202 (having a function of the HMD companion app 190 installed therein) of the smartphone 200 is illustrated.

An inquiry about the state of the second communication mode is made from the smartphone 200 to the control unit 160 (step S701), and a reply about the state of the second communication mode to the inquiry is made from the control unit 160 to the smartphone 200 (step S703). In the example shown in FIG. 13, in step S703, information indicating that the state of the second communication mode is disabled is transmitted. Thus, the smartphone 200 transmits an instruction for causing the second communication device 166 to be set to the active state to the control unit 160 (step S705). In response to the instruction, a response indicating that the second communication mode is enabled is transmitted from the control unit 160 to the smartphone 200 (step S707). The communication in the process shown in steps S701 to S707 is performed through the first communication mode.

Subsequent to process shown in steps S701 to S707, in the control unit 160, under the control by the processor 162 (e.g., the control by the drive control unit 312 shown in FIG. 5 described above), the second communication device 166 is set to the active state (step S709), and the information indicating that the second communication device 166 is activated is transmitted to the processor 162 (step S711). Similarly, in the smartphone 200, a process of setting the second communication device 206 to the active state (steps S713 and S715) is performed. The activation process of the second communication devices 166 and 206 shown in steps S709 to S715 may be performed in a stage preceding the timing shown in FIG. 13. When the second communication devices 166 and 206 perform transition from the inactive state to the active state, it takes time as compared with a case where transition from the power-saving state to the active state is performed. Thus, when the series of processes shown in FIG. 13 are necessary to be performed in a shorter time, the process shown in steps S709 to S715 is preferably performed at a timing of the preceding stage.

In the smartphone 200, a process of activating group owner (GO), which is a function of the second communication device 206, is also performed (steps S717 and S719). The group owner is a function for performing the authenticate process of the communication, and various types of information necessary for authentication (IDs, passwords, or the like) is managed by the group owner. The group owner may be provided in one of the devices in which the communication path is established. In the example shown in FIG. 13, the second communication device 206 of the smartphone 200 is provided with the group owner, and thus the smartphone 200 plays a key role in performing the communication authentication process. The second communication device 166 of the control unit 160 may be provided with the group owner. In this case, the control unit 160 plays a key role in performing the communication authentication process.

When the group owner is activated, the communication authentication process in the second communication mode is performed. Specifically, in order to check whether the authentication process is executable, the state of the second communication mode is transmitted from the control unit 160 to the smartphone 200 (step S721). When the second communication mode is enabled (i.e., when the authentication process is executable), a various types of information necessary to perform the authentication process, such as IDs and passwords, is transmitted from the smartphone 200 to the control unit 160 (step S723). The control unit 160, when receiving these pieces of information, transmits information indicating that it is performing the connection process as the information about the connection state in the second communication mode to the smartphone 200 (step S725). The communication in the process shown in steps S721 to S725 is performed through the first communication mode.

Subsequently, the processor 162 (e.g., the drive control unit 312) provides an instruction to initiate the authentication process to the second communication device 166 (step S727). In response to the instruction, a process of establishing a communication path between the second communication device 166 of the control unit 160 and the second communication device 206 of the smartphone 200 is performed (steps S729 to S733). In the process shown in steps S729 to S733, as one example, the state of a terminal used for communication is checked against each other, and a communication path is established between the second communication device 166 and the second communication device 206. When the communication path is established, information indicating this fact is transmitted from the second communication device 166 to the processor 162 (step S735).

The process described above is an example of the specific processing procedure for the authentication process for communication in the second communication mode using the first communication mode. When the process shown in step S735 is terminated, the communication path in the first communication mode and the communication path in the second communication mode are all established, and thus the control unit 160 and the smartphone 200 can perform communication by selecting one of the communication modes.

The subsequent process corresponds to the power-saving process by communication function deactivation and the power-saving process during use of communication function described with reference to FIGS. 7 and 9. As one example, when the communication necessity information is acquired and the second communication mode is selected by the communication mode selection unit 313 on the basis of the communication necessity information, the process for switching the communication mode from the first communication mode to the second communication mode is performed. Specifically, as shown in FIG. 13, the control unit 160 transmits information indicating that it is being connected as the information about the connection state of the second communication mode to the smartphone 200 (step S737). The smartphone 200 transmits a response indicating that the communication path is switched to the communication path in the second communication mode to the control unit 160 (step S739). When the process shown in step S737 is performed, then the transmission of the information from the control unit 160 is performed through the second communication mode, the reception of the information by the smartphone 200 is performed through the second communication mode. In addition, when the process shown in step S739 is performed, then the reception of the information by the control unit 160 is performed through the second communication mode and the transmission of the information from the smartphone 200 is performed through the second communication. Thus, after the process shown in steps S737 and S739 is performed, the communication between the smartphone 200 and the control unit 160 is performed through the second communication mode (step S741).

In this state, as on example, when the communication necessity information is acquired again and the first communication mode is selected by the communication mode selection unit 313 on the basis of the communication necessity information, the process for switching the communication mode from the second communication mode to the first communication mode is performed. In FIG. 13, as on example, a process performed until the power-saving process by communication function deactivation is continuously performed and the second communication devices 166 and 206 perform transition to the inactive state after the communication mode is switched from the second communication mode to the first communication mode is illustrated.

Specifically, as shown in FIG. 13, an instruction for causing the second communication device 166 to be set to the inactive state is transmitted from the smartphone 200 to the control unit 160 (step S743). If the second communication devices 166 and 206 does not perform transition to the inactive state and is kept in the active state or perform transition to the power-saving state, the instruction transmitted in step S743 may be other instructions, such as an instruction for causing the communication path in the second communication mode to be disconnected.

The control unit 160, when receiving the instruction for causing the second communication device 166 to be set to the inactive state, transmits an instruction for switching the communication path to the communication path in the first communication mode to the smartphone 200 (step S745). The smartphone 200 transmits a response with respect to the instruction to the control unit 160 (step S747). When the process shown in step S745 is performed, then the transmission of the information from the control unit 160 is performed through the first communication mode, the reception of the information by the smartphone 200 is performed through the first communication mode. In addition, when the process shown in step S747 is performed, then the reception of the information by the control unit 160 is performed through the first communication mode and the transmission of the information from the smartphone 200 is performed through the first communication. Thus, after the process shown in steps S741 and S743 is performed, the communication between the smartphone 200 and the control unit 160 is performed through the first communication mode.

The subsequent process corresponds to a process for allowing the second communication devices 166 and 206 to be set to the inactive state. In the case where the communication path is switched, in the control unit 160, the processor 162 (e.g., the drive control unit 312) outputs an instruction to disconnect the connection through the second communication mode to the second communication device 166 (step S749). In response to this, the second communication device 166 transmits information indicating that the connection through the second communication mode is disconnected is transmitted to the processor 162 (step S751). In addition, the control unit 160 transmits the information, which indicates that the connection through the second communication mode is transmitted, to the smartphone 200 as the information about the connection state of the second communication mode (step S755).

Moreover, in the smartphone 200, the second communication device 206 is set to the inactive state (step S753) under the control by the processor 202. In the control unit 160, the second communication device 166 is set to the inactive state (step S757) under the control by the processor 162 (e.g., the drive control unit 312) and the information indicating that the second communication device 166 is set to the inactive state is transmitted to the processor 162 (step S759). Furthermore, the information indicating that the state of the second communication mode is disabled is transmitted from the control unit 160 to the smartphone 200 (step S761). If the second communication devices 166 and 206 does not perform transition to the inactive state and is kept in the active state or perform transition to the power-saving state, the process in steps S749 to S761 is not necessarily performed.

The communication authentication process in the second communication mode using the first communication mode has been described above with reference to FIGS. 12 and 13. As described above, in the present modified example, various types of information used to authenticate the communication in the second communication mode is transmitted, and the communication path of the second communication mode is established on the basis of the information. In addition, as the first communication mode, a communication mode in which the authentication process is executable by a relative easy task may be suitably selected. Thus, the task performed by the user makes it possible to reduce not only the relatively easy authentication process in the first communication mode but also the burden on the user.

In this connection, as one example, a case where the wireless LAN is used as the second communication mode is considered. When the user performs the authentication process in the wireless LAN manually, the user typically performs a task of inputting information such as IDs and passwords while referring to a setting screen displayed on a display. In this task, a display of a setting screen in the authentication process or an input of information by the user is likely to be susceptible to eavesdropping by a third party and it is difficult to ensure satisfactory safety. On the other hand, in the present modified example, various types of information related to the authentication of the second communication mode using the first communication mode is transmitted, and thus such information is less likely to be observed directly by a third party, thereby improving the safety in the authentication process. In addition, the use of a communication mode excellent in the safety during communication as the first communication mode makes it possible to achieve the improved effects of such safety even more.

When the control unit 160 and the smartphone 200 are configured to be capable of communicating through a communication mode other than the first and second communication modes, the authentication process is performed through the most secure communication mode and then the authentication process through another communication mode using the most secure communication mode may be performed. This makes it possible to perform the authentication process through the respective communication modes with higher security.

(6-2. Modified Example Having Common Antenna)

Although not explicitly shown in FIG. 2, in the present embodiment, the control unit 160 may be configured to include a single antenna that is shared between the first communication device 165 and the second communication device 166. According to the present modified example, providing such common antenna eliminates the necessity for providing a separate antenna to each of the first communication device 165 and the second communication device 166, and thus it is possible to achieve a compact and lightweight control unit 160.

However, there is a case where the frequency bands to be used are partially overlapped depending on the characteristics of the first communication mode and the second communication mode. In this case, when the communication using the first communication mode and the second communication mode is performed via the common antenna, the efficiency during communication is likely to be reduced. Thus, in the present modified example, the control unit 160 may be configured so that one of the first communication mode and the second communication mode communicates with the smartphone 200 serving as an external device meanwhile the other does not perform communication.

Figure 14:
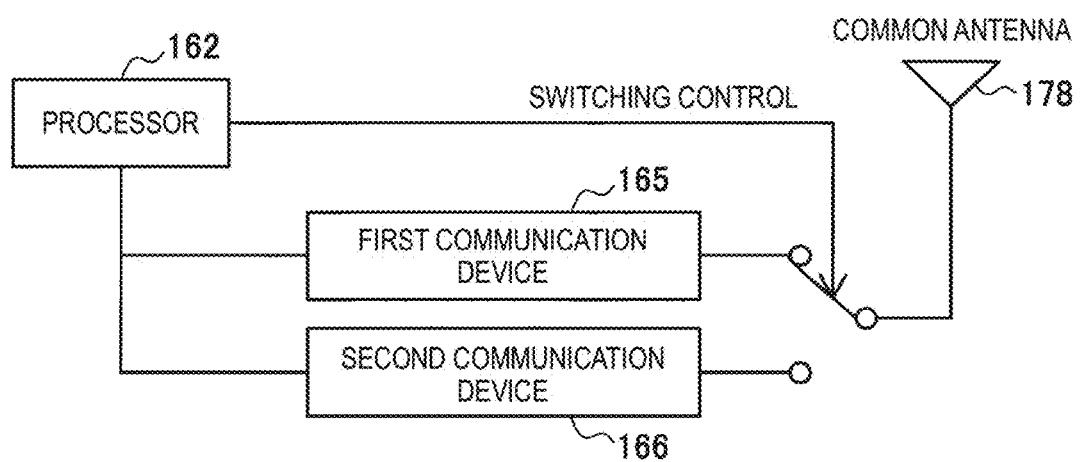
FIG. 14 is a diagram illustrated to describe the control of the first communication device and the second communication device in a modified example in which the control unit includes a common antenna.

An example of the control of the first communication device 165 and the second communication device 166 in a modified example in which the control unit 160 includes a common antenna will be described with reference to FIG. 14. FIG. 14 is a diagram illustrated to describe the control of the first communication device 165 and the second communication device 166 in a modified example in which the control unit 160 includes a common antenna.

As shown in FIG. 14, in the present embodiment, the first communication device 165 and the second communication device 166 are connected to a common antenna 178. The connection between the common antenna 178 and the first communication device 165 and the connection between the common antenna 178 and the second communication device 166 are configured to be switchable at high speed under the control by the processor 162. The processor 162 can allow one of the first communication device and the second communication device 166 to be connected to the common antenna 178 for performing the communication. This makes it possible to prevent the communication using the first communication mode and the communication using the second communication mode from overlapping, thereby performing the communication more efficiently.

In this connection, when the control unit 160 transmits the information, the transmission timing can, or course, be recognized by the processor 162 of the control unit 160, thus it is easily possible to perform the switching control at an appropriate timing. On the other hand, when the control unit 160 receives the information, the reception timing is difficult to be predicted, and thus sometimes it may be difficult to perform the switching control at an appropriate timing. Thus, in the present modified example, the switching control between the first communication device 165 and the common antenna 178 and between the second communication device 166 and the common antenna 178 may be performed only when the control unit 160 transmits various types of information to the smartphone 200. In addition, in this case, the switching control with the common antenna 178 may be performed through only a port for information transmission provided in the first communication device 165 and the second communication device 166, and a port for information reception may be typically connected to the common antenna 178. This makes it possible to receive reliably the information and to eliminate the necessity for the complicated control, and accordingly, resulting in a simpler configuration that allows improved effects of communication efficiency to be achieved.

The switching between the common antenna 178 and the first communication device 165 and the second communication device 166 may be performed by an electrical circuit including various switching elements or may be implemented in software. However, in the case of using a switching element, it is necessary to provide a circuit for a switching element the processor 162, the first communication device 165, or the second communication device 166 as an additional component, which may lead to the increase in cost. On the other hand, in the case where it is implemented in software, the switching function as described above can be added without modifying the hardware configuration, and thus it is possible to implement the configuration according to the present modified example with relative ease. In the example shown in FIG. 14, for the purpose of description, the switching is conceptually illustrated to be performed by a switch, but in the case where the switching between the common antenna 178 and the first communication device 165 and the second communication device 166 is implemented in software, the drive of the first communication device 165 and the second communication device 166 may be controlled by software, such as so that one of the communication devices transmits information to the smartphone 200 via the common antenna 178 meanwhile the other does not transmit the information.

The modified example in which the control unit 160 includes the common antenna 178 has been described. As described above, in the present modified example, in the control unit 160, the first communication device 165 and the second communication device 166 share a single antenna to communicate with the smartphone 200, and thus it is possible to achieve the compact and lightweight control unit 160. In addition, in the present modified example, the control unit 160 may be configured so that one of the first communication device 165 and the second communication device 166 communicates with the smartphone 200, meanwhile, the other does not perform communication. This makes it possible to prevent the communication using the first communication mode and the communication using the second communication mode from interfering with each other, thereby performing the communication more efficiently.

(6-3. Other Modified Examples)

The present embodiment may employ the following configuration in addition to the embodiments and modified examples described above.

As one example, the communication necessity information may contain information relating to the distance between devices that perform communication (between the control unit 160 and the smartphone 200), and the communication mode selection unit 313 may select a communication mode on the basis of the information relating to the distance. As one example, when one of the first communication mode and the second communication mode has characteristics suitable for relatively long distance communication and the other has characteristics suitable for relatively short distance communication, the communication mode selection unit 313 can select a communication mode that is more suitable for the distance on the basis of the information relating to the distance. In addition, when the control unit 160 and the smartphone 200 are closer to each other than a predetermined distance, the communication mode selection unit 313 may be previously set to select one communication mode. Such control allows the user to switch the communication mode in an intended fashion by approaching the control unit 160 to the smartphone 200. The information relating to the distance between devices may be acquired, as one example, by the control unit 160 or the smartphone 200 including various distance measuring sensors using infrared, ultrasonic, laser beam, or the like.

Further, as one example, the communication necessity information described above may contain information relating to the communication performance of an external device (the smartphone 200) that performs communication with the control unit 160. The communication mode selection unit 313 may select a communication mode on the basis of the information relating to the communication performance. As one example, when the second communication mode is a wireless LAN, there may be several standards in the wireless LAN. Thus, a case in which whether the communication system installed in the control unit 160 and the communication system installed in the smartphone 200 are communicable with each other suitably is not clear may be considered. Thus, the communication mode selection unit 313 of the control unit 160 can select the communication mode that is more suitable for the communication system installed in the smartphone 200, on the basis of the information relating to the communication performance of the smartphone 200. The information relating to the communication performance of the smartphone 200 may be acquired from the control unit 160 in which information relating to the specification of the smartphone 200 is registered previously in the control unit 160.

Further, the first communication mode may be a communication mode that operates at a relatively high speed (high transfer rate) but is unstable and the second communication mode may be a communication mode that operates at a relatively low speed (low transfer rate) but is stable. In this case, the communication mode selection unit 313 may select one of the communication modes depending on the properties of information to be transmitted or received, which is contained in the communication necessity information. As one example, when the information to be transmitted or received is information having on concept of time like image data, the communication mode that operates at a relatively high speed but is unstable may be selected. When the information is information having a concept of time like audio data, the communication mode that operates at a relatively low speed but is stable may be selected.

As shown in FIG. 2, in the present embodiment, the display unit 110 of the HMD 100 is configured to include the illuminance sensor 116 and the motion sensor 118. In addition, the smartphone 200 is configured to include the sensor 210 and the GPS receiver 216. In the present embodiment, the communication necessity information may contain information acquired from these various sensors. The communication mode selection unit 313 may select the communication mode on the basis of the information acquired by the sensors. As one example, the determination of whether the display unit 110 is located at a bright place or a dark place may be performed from the information acquired by the illuminance sensor 116. In addition, the attitude or movement of the display unit 110 may be determined from the information acquired by the motion sensor 118. Further, the position of the HMD 100 may be determined from the information acquired by the GPS receiver 216. In a case where it is determined that the display unit 110 is placed in a particular attitude, a case where it is determined that the display unit 110 is located at a particular bright place from these pieces of information, or a case where it is determined that the HMD 100 is placed at a particular location (e.g., the user's home and company), the communication mode selection unit 313 may select a communication mode that is previously set. This allows the user to switch the communication mode to a desired one by setting the display unit 110 to the predetermined attitude or by changing the brightness surrounding the display unit 110 when the user wants to perform communication using one communication mode in an intended fashion.

Moreover, in the present embodiment, the control unit 160 may be configured not to perform a process for searching a communicable external device other than the smartphone 200 that is subject to the authentication process for communication. As one example, a communication device that typically communicates using a wireless LAN is often provided with a function of searching automatically a communicable external device. To perform the authentication process in the communication using the wireless LAN, the user can select one of the searched external devices, which is intended to communicate by the user. However, as described in the above item (6-1. Communication authentication process), in the present embodiment, as one example, the authentication process of the second communication mode that is the wireless LAN may be performed by the communication using the first communication mode. Thus, it is possible to establish a connection with an external device using the second communication mode even without performing the search process as described above. In the present embodiment, the control unit 160 can be configured not to perform the search process described above, and thus it is possible to reduce the power consumption of the HMD 100 even more.

In the present embodiment, when the communication path using one communication mode is not established due to some sort of reason (unable to connect), the communication using the other communication mode may be performed. As one example, there may be a case where it is determined that high-speed communication is necessary on the basis of the communication necessity information, the second communication mode capable of performing data transfer at a higher rate is selected by the communication mode selection unit 313 but the communication path using the second communication mode is not established due to some sort of reason, and thus the communication is not performed. In this case, when a task of restoring the connection is performed a predetermined number of times but the connection using the second communication mode is not possible to be performed, the communication mode selection unit 313 may select the first communication mode as an another option, and thus the communication using the first communication mode is performed. The communication using the first communication mode is performed at a rate lower than that of the second communication mode, inconvenience such as a delay in the execution of an application in the HMD 100 is likely to occur, but the situation in which the application is not executed can be prevented. In this way, when the communication using one communication mode is not possible to be performed, the communication using the other communication mode can be performed in an alternative manner. Thus, the user can continue using the HMD 100 without causing various processes in the HMD 100 to be stopped.

(5. Hardware Configuration)

Figure 15:
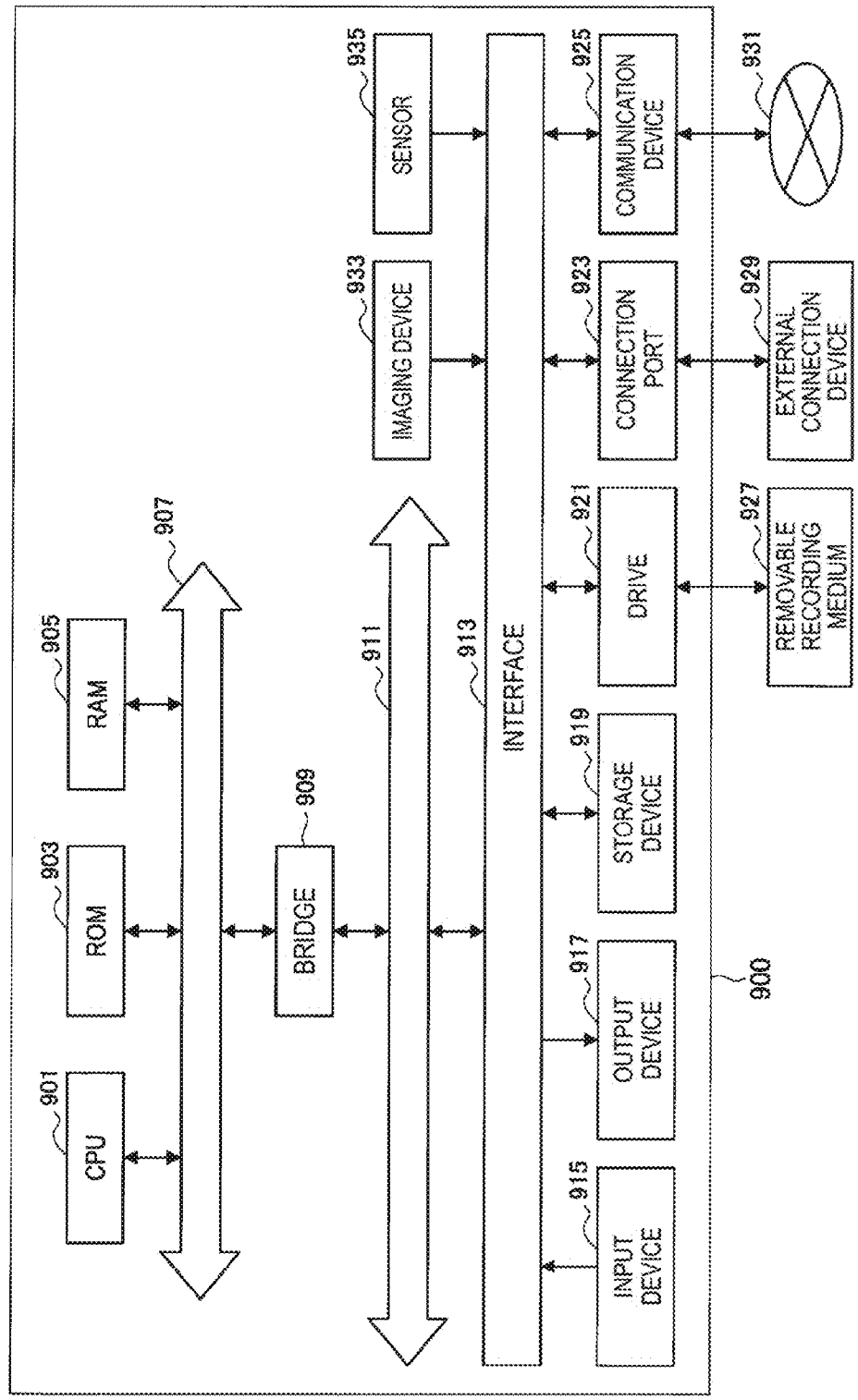
FIG. 15 is a block diagram showing an exemplary hardware configuration of the electronic apparatus according to an embodiment of the present disclosure.

Next, a hardware configuration of an electronic apparatus according to an embodiment of the present disclosure will be described with reference to FIG. 15. FIG. 15 is a block diagram showing an example of the hardware configuration of the electronic apparatus according to an embodiment of the present disclosure. The illustrated electronic apparatus 900 can realize, for example, a configuration of the HMD 100, the smartphone 200, and/or the server 300 of the above-described embodiments.

The electronic apparatus 900 includes a CPU (Central Processing Unit) 901, ROM 903, and RAM 905. In addition, the electronic apparatus 900 may include a host bus 907, a bridge 909, an external bus 911, an interface 913, an input device 915, an output device 917, a storage device 919, a drive 921, a connection port 923, and a communication device 925. Further, the electronic apparatus 900 may include an imaging device 933 and a sensor 935 as necessary. The electronic apparatus 900 may include a processing circuit such as a DSP (Digital Signal Processor) or ASIC (Application Specific Integrated Circuit), alternatively or in addition to the CPU 901.

The CPU 901 serves as an operation processor and a controller, and controls all or some operations in the electronic apparatus 900 in accordance with various programs recorded in the ROM 903, the RAM 905, the storage device 919 or a removable recording medium 927. The ROM 903 stores programs and operation parameters which are used by the CPU 901. The RAM 905 temporarily stores program which are used in the execution of the CPU 901 and parameters which are appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909. In the present embodiment, the CPU 901 is implemented as the processors 162, 202, and 302 of the control unit 160, the smartphone 200, and the server 300 shown in FIG. 2, respectively, as an example. Each of the ROM 903 and the RAM 905 is implemented as the memories 164, 204, and 304 of the control unit 160, the smartphone 200, and the server 300 shown in FIG. 2, respectively, as an example.

The input device 915 is a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the electronic apparatus 900. Furthermore, the input device 915 includes an input control circuit which generates an input signal on the basis of the information which is input by a user and outputs the input signal to the CPU 901. By operating the input device 915, a user can input various types of data to the electronic apparatus 900 or issue instructions for causing the electronic apparatus 900 to perform a processing operation. In the present embodiment, the input device 915 is implemented as the input key 168, the touch sensor 170, and the microphone 172 of the control unit 160, and the microphone 218 and the touch panel 214 of the smartphone 200 shown in FIG. 2, as an example.

The output device 917 includes a device capable of visually or audibly notifying the user of acquired information. The output device 917 may include a display device such as an LCD (Liquid Crystal Display), a PDP (Plasma Display Panel), and an organic EL (Electro-Luminescence) displays, an audio output device such as a speaker or a headphone, and a peripheral device such as a printer. The output device 917 may output the results obtained from the process of the electronic apparatus 900 in a form of a video such as text or an image, and an audio such as voice or sound. In the present embodiment, the display device is implemented as the display 212 of the smartphone 200 shown in FIG. 2, as an example. The voice output device is implemented as the speaker 174 of the control unit 160 and the speaker 220 of the smartphone 200 shown in FIG. 2, as an example.

The storage device 919 is a device for data storage which is configured as an example of a storage unit of the electronic apparatus 900. The storage device 919 includes, for example, a magnetic storage device such as a HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the electronic apparatus 900 or attached externally thereto. The drive 921 reads information recorded in the removable recording medium 927 attached thereto, and outputs the read information to the RAM 905. Further, the drive 921 writes in the removable recording medium 927 attached thereto.

The connection port 923 is a port used to directly connect devices to the electronic apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (registered trademark) (High-Definition Multimedia Interface) port, and so on. The connection of the external connection device 929 to the connection port 923 makes it possible to exchange various data between the electronic apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth, WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like. In the present embodiment, the communication device 925 is implemented as the first and second communication devices 165 and 166 of the control unit 160, the first and second communication devices 205 and 206 of the smartphone 200, and the mobile communication device 208 of the server 300 shown in FIG. 2, as an example.

The imaging device 933 is a device that generates an image by imaging a real space using an image sensor such as a charge-coupled device (CCD) or a complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images. In the present embodiment, the imaging device 933 is implemented as the camera 120 of the control unit 160 shown in FIG. 2, as an example.

The sensor 935 is any of various sensors such as an acceleration sensor, a gyro sensor, a geomagnetic sensor, an optical sensor, or a sound sensor, for example. The sensor 935 acquires information regarding the state of the electronic apparatus 900, such as the orientation of the case of the electronic apparatus 900, as well as information regarding the environment surrounding the electronic apparatus 900, such as the brightness or noise surrounding the electronic apparatus 900, for example. The sensor 935 may also include a Global Positioning System (GPS) sensor that receives GPS signals and measures the latitude, longitude, and altitude of the apparatus. In the present embodiment, the sensor 935 is implemented as the illuminance sensor 116 and the motion sensor 118 of the display unit 110, and the sensor 210 and the GPS receiver 216 of the smartphone 200 shown in FIG. 2, as an example.

The foregoing thus illustrates an exemplary hardware configuration of the electronic apparatus 900. Each of the above components may be realized using general-purpose members, but may also be realized in hardware specialized in the function of each component. Such a configuration may also be modified as appropriate according to the technological level at the time of the implementation.

It is possible to create a computer program used to implement each function of the electronic apparatus 900 as described above and to install the computer program in PC or the like. It is also possible to provide a computer readable recording medium that stores such computer program therein. An example of the recording medium includes a magnetic disk, an optical disk, a magneto-optical disk, and flash memory. The computer program described above may be delivered via a network without use of the recording medium.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The effects described in the specification are just explanatory or exemplary effects, and are not limiting. That is, the technology according to the present disclosure can exhibit other effects that are apparent to a person skilled in the art from the descriptions in the specification, along with the above effects or instead of the above effects.

As one example, in the above embodiments, there has been described the case where the HMD 100 and the smartphone 200 are configured to communicate with each other using two types of communication modes (first and second communication modes). However, the present technology is not limited thereto. As one example, the HMD 100 and the smartphone 200 may be configured to communicate with each other using many different types of communication modes. When there are three or more types of communication modes, the respective processes similar to those according to the embodiments described above can be performed, and thus similar effects can be obtained.

Additionally, the present technology may also be configured as below.

(1)

A communication control device including:

a communication necessity information acquisition unit configured to acquire communication necessity information indicating necessity to communicate with an external device; and a drive control unit configured to control drive of a first communication unit and a second communication unit on a basis of the acquired communication necessity information, the first communication unit communicating with the external device using a first communication mode, the second communication unit communicating with the external device using a second communication mode capable of transferring data at a rate higher than the first communication mode, wherein the drive control unit controls a drive state of each of the first communication unit and the second communication unit to be set to one of an active state capable of communicating with the external device, a power-saving state having lower power consumption than the active state, and an inactive state being a power off state.

(2)

The communication control device according to (1), wherein, when the communication necessity information is not acquired in a predetermined time, the drive control unit sets at least one of the first communication unit and the second communication unit to the power-saving state.

(3)

The communication control device according to (2), wherein, when the communication necessity information is not acquired in a further predetermined time, the drive control unit sets at least one of the first communication unit and the second communication unit to the inactive state.

(4)

The communication control device according to any one of (1) to (3), wherein, when the communication necessity information is acquired, the drive control unit sets at least one of the first communication unit and the second communication unit to the active state.

(5)

The communication control device according to (4), wherein, when information indicating that a predetermined operation input is performed by a user is acquired as the communication necessity information, the drive control unit sets at least one of the first communication unit and the second communication unit to the active state.

(6)

The communication control device according to (5), wherein the predetermined operation input is a voice input given by a user.

(7)

The communication control device according to (5), wherein, when information indicating that communication from the external device to at least one of the first communication unit and the second communication unit is performed is acquired as the communication necessity information, the drive control unit sets at least one of the first communication unit and the second communication unit, which performs communication, to the active state.

(8)

The communication control device according to any one of (1) to (7), further including:

a communication mode selection unit configured to select a communication mode used to perform communication from the first communication unit and the second communication unit on a basis of the communication necessity information, wherein the drive control unit sets a drive state of at least one of the first communication unit and the second communication unit, which corresponds to the communication mode selected by the communication mode selection unit, to the active state and causes the selected communication unit to communicate with the external device.

(9)

The communication control device according to (8), wherein the communication mode selection unit selects the communication mode in such a way as to reduce power consumption depending on an amount of communication data predicted on a basis of the communication necessity information.

(10)

The communication control device according to (8) or (9), wherein, when a transfer data rate predicted on a basis of the communication necessity information exceeds a predetermined threshold value, the communication mode selection unit selects the second communication mode, and wherein the drive control unit causes the second communication unit to communicate with the external device.

(11)

The communication control device according to any one of (8) to (10), wherein, when information indicating that a given application is activated is acquired as the communication necessity information, the communication mode selection unit selects the second communication mode, and wherein the drive control unit causes the second communication unit to communicate with the external device.

(12)

The communication control device according to any one of (1) to (11), wherein the drive control unit sets a drive state of one of the first communication unit and the second communication unit, which does not perform communication, to the power-saving state or the inactive state.

(13)

The communication control device according to any one of (1) to (12), wherein the communication with the external device in the second communication mode is subject to an authentication process that is performed by the communication with the external device using the first communication mode.

(14)

The communication control device according to (13), wherein, when a communication path is established with the external device in the second communication mode, the second communication unit is prevented from establishing a communication path with another external device.

(15)

The communication control device according to any one of (1) to (14), wherein the first communication unit and the second communication unit communicate with the external device via a common antenna, and wherein one of the first communication unit and the second communication unit transmits information to the external device via the antenna, and meanwhile, the other is prevented from transmitting information to the external device via the antenna.

(16)

The communication control device according to any one of (1) to (15), wherein the communication control device controls communication between the external device and a wearable terminal used while being attached to a user.

(17)

The communication control device according to any one of (1) to (16), wherein, when both the first communication unit and the second communication unit are set to one of the power-saving state and the inactive state, at least one function of a processor of the communication control device is deactivated.

(18)

The communication control device according to (17), wherein, when communication from the external device to at least one of the first communication unit and the second communication unit is performed, the deactivated function of the processor of the communication control device is restored.

(19)

A method of controlling communication, the method including:

acquiring communication necessity information indicating necessity to communicate with an external device; and controlling drive of a first communication unit and a second communication unit on a basis of the acquired communication necessity information, the first communication unit communicating with the external device using a first communication mode, the second communication unit communicating with the external device using a second communication mode capable of transferring data at a rate higher than the first communication mode, wherein a drive state of each of the first communication unit and the second communication unit is controlled to be set to one of an active state capable of communicating with the external device, a power-saving state having lower power consumption than the active state, and an inactive state being a power off state.

(20)

A program for causing a processor of a computer to implement:

a function of acquiring communication necessity information indicating necessity to communicate with an external device; and a function of controlling drive of a first communication unit and a second communication unit on a basis of the acquired communication necessity information, the first communication unit communicating with the external device using a first communication mode, the second communication unit communicating with the external device using a second communication mode capable of transferring data at a rate higher than the first communication mode, wherein a drive state of each of the first communication unit and the second communication unit is controlled to be set to one of an active state capable of communicating with the external device, a power-saving state having lower power consumption than the active state, and an inactive state being a power off state.

REFERENCE SIGNS LIST

10 system
100 head-mounted display (HMD)
110 display unit
112 light source
114 light guide plate
116 illuminance sensor
118 motion sensor
160 control unit
162, 202, 302 processor
164 memory
165, 205 first communication device
166, 206 second communication device
200 smartphone
204 memory
300 server
304 memory
310 controller
311 communication necessity information acquisition unit
312 drive control unit
313 communication mode selection unit

The invention claimed is:

1. A communication control device comprising:
a processing device and a memory containing instructions that, when executed by the processing device, implement:
a communication necessity information acquisition unit configured to acquire communication necessity information indicating necessity to communicate with an external device;
a drive control unit configured to control drive of a first communication unit and a second communication unit on a basis of the acquired communication necessity information, the first communication unit communicating with the external device using a first communication mode, the second communication unit communicating with the external device using a second communication mode capable of transferring data at a rate higher than the first communication mode; and
a communication mode selection unit configured to select a communication mode to perform communication from the first communication unit and the second communication unit based on an amount of communication data predicted from the communication necessity information, so that communication is performed with low power consumption,
wherein the drive control unit sets a drive state of the selected communication unit to the active state and causes the selected communication unit to communicate with the external device, and sets the drive state of the non-selected communication unit to a power-saving state and wherein an authentication process for communication with the external device in the second communication mode is performed by communication with the external device using the first communication mode.

2. The communication control device according to claim 1, wherein, when the communication necessity information is not acquired in a predetermined time, the drive control unit sets at least one of the first communication unit and the second communication unit to the power-saving state.

3. The communication control device according to claim 2, wherein, when the communication necessity information is not acquired in a further predetermined time, the drive control unit sets at least one of the first communication unit and the second communication unit to the inactive state.

4. The communication control device according to claim 1, wherein, when the communication necessity information is acquired, the drive control unit sets at least one of the first communication unit and the second communication unit to the active state.

5. The communication control device according to claim 4, wherein, when information indicating that a predetermined operation input is performed by a user is acquired as the communication necessity information, the drive control unit sets at least one of the first communication unit and the second communication unit to the active state.

6. The communication control device according to claim 5, wherein the predetermined operation input is a voice input given by a user.

7. The communication control device according to claim 5, wherein, when information indicating that communication from the external device to at least one of the first communication unit and the second communication unit is performed is acquired as the communication necessity information, the drive control unit sets at least one of the first communication unit and the second communication unit, which performs communication, to the active state.

8. The communication control device according to claim 1, wherein, when a transfer data rate predicted on a basis of the communication necessity information exceeds a predetermined threshold value, the communication mode selection unit selects the second communication mode, and wherein the drive control unit causes the second communication unit to communicate with the external device.

9. The communication control device according to claim 1, wherein, when information indicating that a given application is activated is acquired as the communication necessity information, the communication mode selection unit selects the second communication mode, and wherein the drive control unit causes the second communication unit to communicate with the external device.

10. The communication control device according to claim 1, wherein the drive control unit sets a drive state of one of the first communication unit and the second communication unit, which does not perform communication, to the power-saving state or the inactive state.

11. The communication control device according to claim 1, wherein, when a communication path is established with the external device in the second communication mode, the second communication unit is prevented from establishing a communication path with another external device.

12. The communication control device according to claim 1, wherein the communication control device controls communication between the external device and a wearable terminal used while being attached to a user.

13. The communication control device according to claim 1, wherein, when both the first communication unit and the second communication unit are set to one of the power-saving state and the inactive state, at least one function of a processor of the communication control device is deactivated.

14. The communication control device according to claim 13, wherein, when communication from the external device to at least one of the first communication unit and the second communication unit is performed, the deactivated function of the processor of the communication control device is restored.

15. The communication control device according to claim 1, wherein selection of the communication mode is further based on a maximum transfer data rate of the first and second communication modes and on a time predicted to be necessary for communication.

16. A method of controlling communication, the method comprising:
acquiring communication necessity information indicating necessity to communicate with an external device;
controlling drive of a first communication unit and a second communication unit on a basis of the acquired communication necessity information, the first communication unit communicating with the external device using a first communication mode, the second communication unit communicating with the external device using a second communication mode capable of transferring data at a rate higher than the first communication mode; and
selecting a communication mode to perform communication from the first communication unit and the second communication unit based on an amount of communication data predicted from the communication necessity information, so that communication is performed with low power consumption,
wherein a drive state of the selected communication unit is controlled to be set to the active state and to cause the selected communication unit to communicate with the external device, and the drive state of the non-selected communication unit is controlled to be set to a power-saving state and wherein an authentication process for communication with the external device in the second communication mode is performed by communication with the external device using the first communication mode.

17. The method of controlling communication according to claim 16, wherein selecting the communication mode is further based on a maximum transfer data rate of the first and second communication modes and on a time predicted to be necessary for communication.

18. A non-transitory computer-readable medium containing instructions that, when executed by a processing device, perform a method comprising:
acquiring communication necessity information indicating necessity to communicate with an external device;

controlling drive of a first communication unit and a second communication unit on a basis of the acquired communication necessity information, the first communication unit communicating with the external device using a first communication mode, the second communication unit communicating with the external device using a second communication mode capable of transferring data at a rate higher than the first communication mode; and selecting a communication mode to perform communication from the first communication unit and the second communication unit based on an amount of communication data predicted from the communication necessity information, so that communication is performed with low power consumption, wherein a drive state of the selected communication unit is controlled to be set to the active state and to cause the selected communication unit to communicate with the external device, and the drive state of the non-selected communication unit is controlled to be set to a power-saving state and wherein an authentication process for communication with the external device in the second communication mode is performed by communication with the external device using the first communication mode.

19. The non-transitory computer-readable medium according to claim 18, wherein selecting the communication mode is further based on a maximum transfer data rate of the first and second communication modes and on a time predicted to be necessary for communication.

\* \* \* \* \*